(12) United States Patent
Horisaki et al.

(10) Patent No.: US 8,649,452 B2
(45) Date of Patent: Feb. 11, 2014

(54) WIRELESS COMMUNICATION DEVICE

(75) Inventors: Koji Horisaki, Yokohama (JP);
Toshiyuki Yamagishi, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 326 days.

(21) Appl. No.: 13/235,644

(22) Filed: Sep. 19, 2011

(65) Prior Publication Data
US 2012/0177136 A1 Jul. 12, 2012

(30) Foreign Application Priority Data
Jan. 12, 2011 (JP) .................................. 2011-004150

(51) Int. Cl.
*H04L 27/28* (2006.01)
*H04L 27/06* (2006.01)

(52) U.S. Cl.
USPC .......................................... 375/260; 375/344

(58) Field of Classification Search
USPC ................................................. 375/260, 344
See application file for complete search history.

(56) References Cited

U.S. PATENT DOCUMENTS

| | | | |
|---|---|---|---|
| 6,219,391 B1 * | 4/2001 | Nakano | 375/346 |
| 7,394,859 B2 | 7/2008 | Mitsugi | |
| 7,701,918 B2 | 4/2010 | Horisaki | |
| 2005/0180461 A1 * | 8/2005 | Kao et al. | 370/480 |
| 2008/0159442 A1 * | 7/2008 | Tanabe et al. | 375/324 |
| 2009/0080576 A1 * | 3/2009 | Xiang | 375/344 |
| 2009/0310722 A1 * | 12/2009 | Lewis | 375/344 |
| 2012/0250741 A1 * | 10/2012 | Chen et al. | 375/219 |

FOREIGN PATENT DOCUMENTS

| | | |
|---|---|---|
| JP | 4153907 | 4/2005 |
| JP | 2006-211608 | 8/2006 |
| JP | 4153916 | 8/2006 |

* cited by examiner

*Primary Examiner* — Don N Vo
(74) *Attorney, Agent, or Firm* — White & Case LLP

(57) ABSTRACT

According to one embodiment, a wireless communication device which comprises an automatic frequency controller configured to detect a radio frequency shift amount between a transmitting side and a receiving side, comprises a controller, a first weight multiplier, and an error correction decoder. The controller is configured to designate subcarrier that suffers interference caused by a DC component based on the radio frequency shift amount detected by the automatic frequency controller. The first weight multiplier is configured to multiply amplitude values of demodulated signals of signals carried by the subcarriers designated by the controller by a weighting coefficient in a range from 0 to 1. The error correction decoder is configured to perform error correction of the demodulated signals multiplied by the weighting coefficient by the first weight multiplier. The controller sets the weighting coefficient to be multiplied by the first weight multiplier based on the radio frequency shift amount.

7 Claims, 16 Drawing Sheets

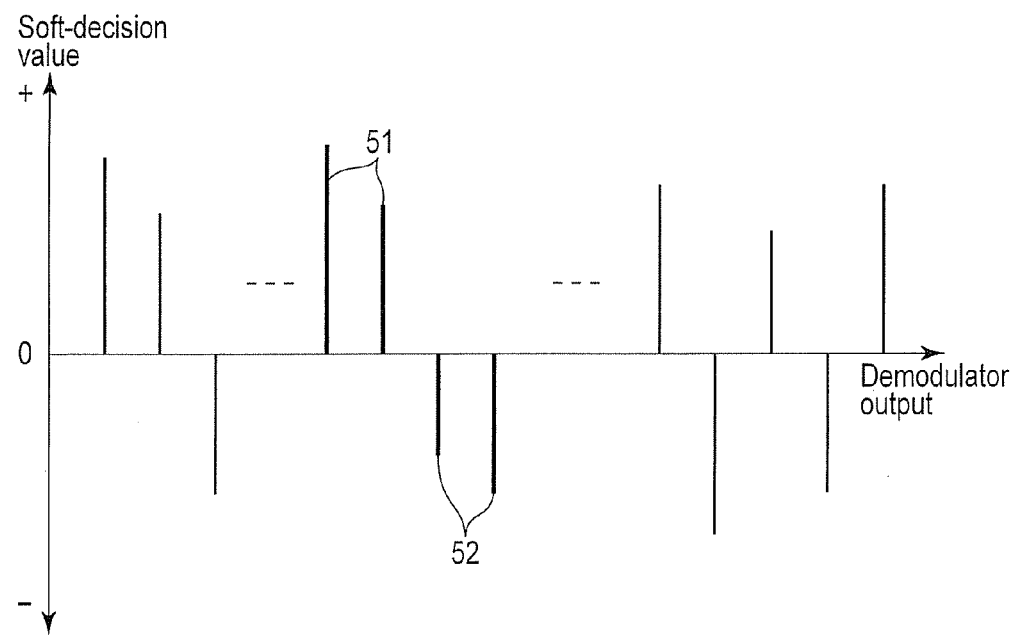
F I G. 6
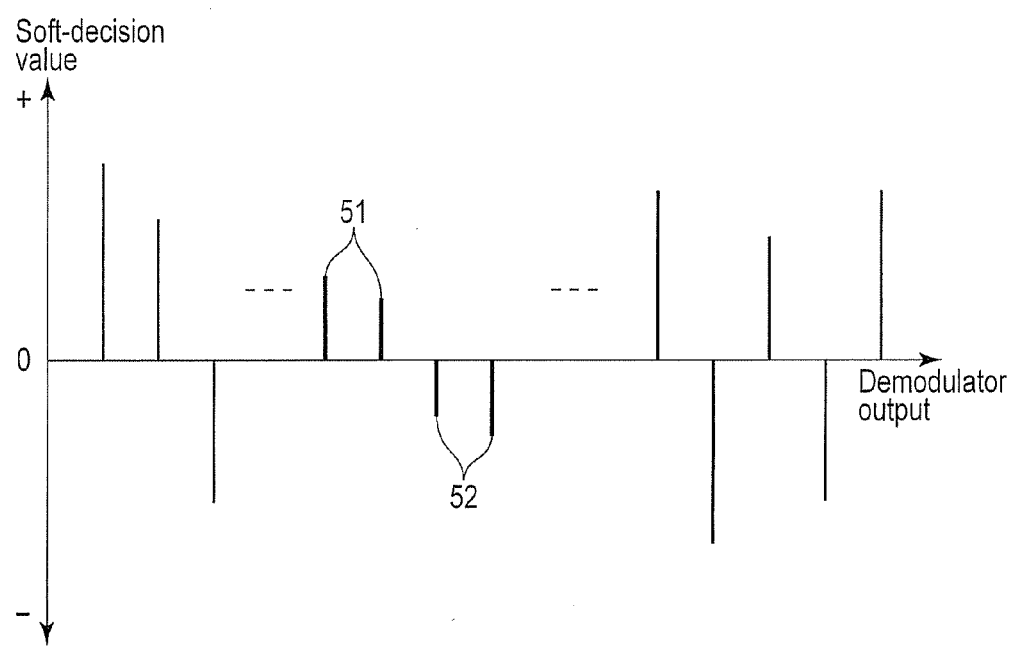
F I G. 7

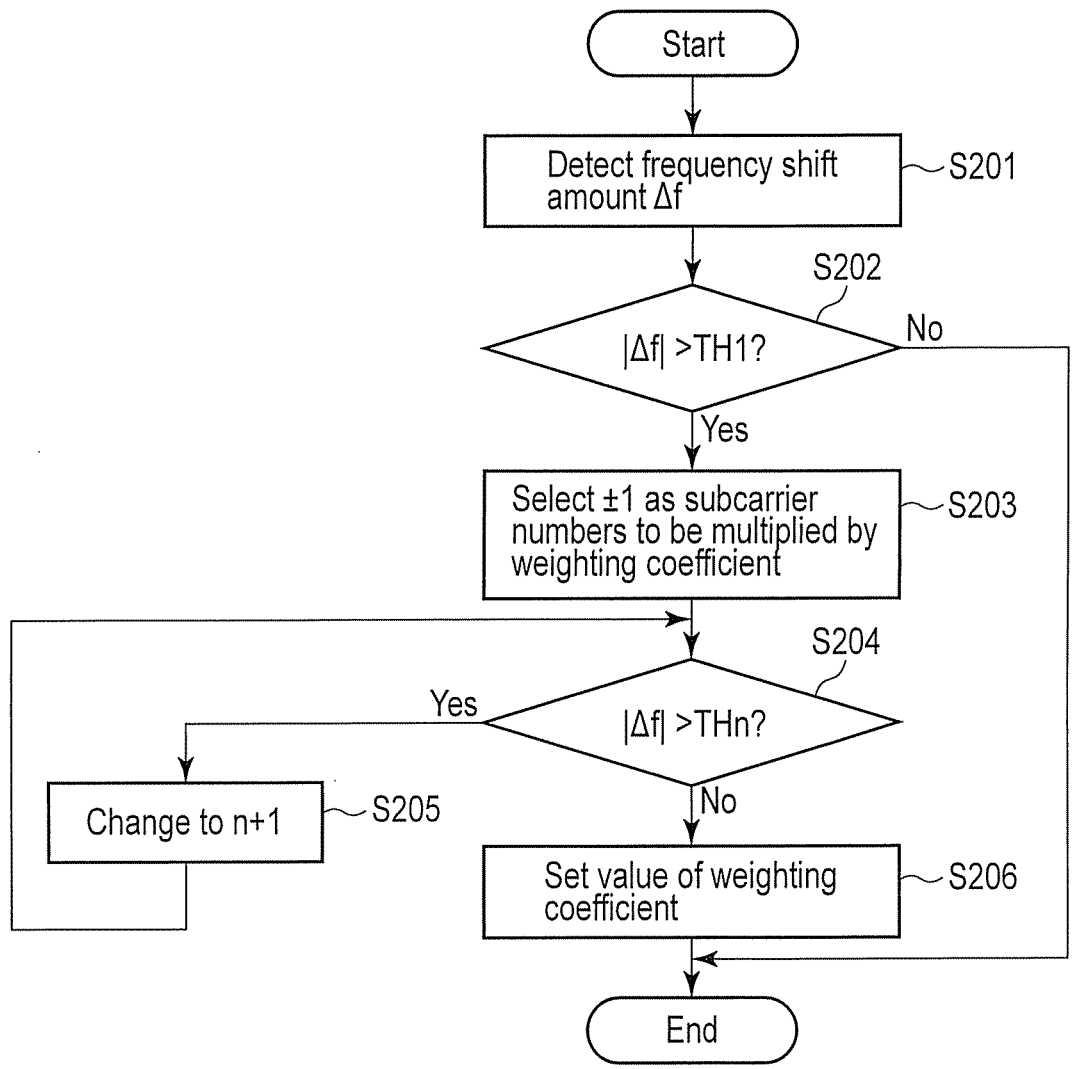
F I G. 9

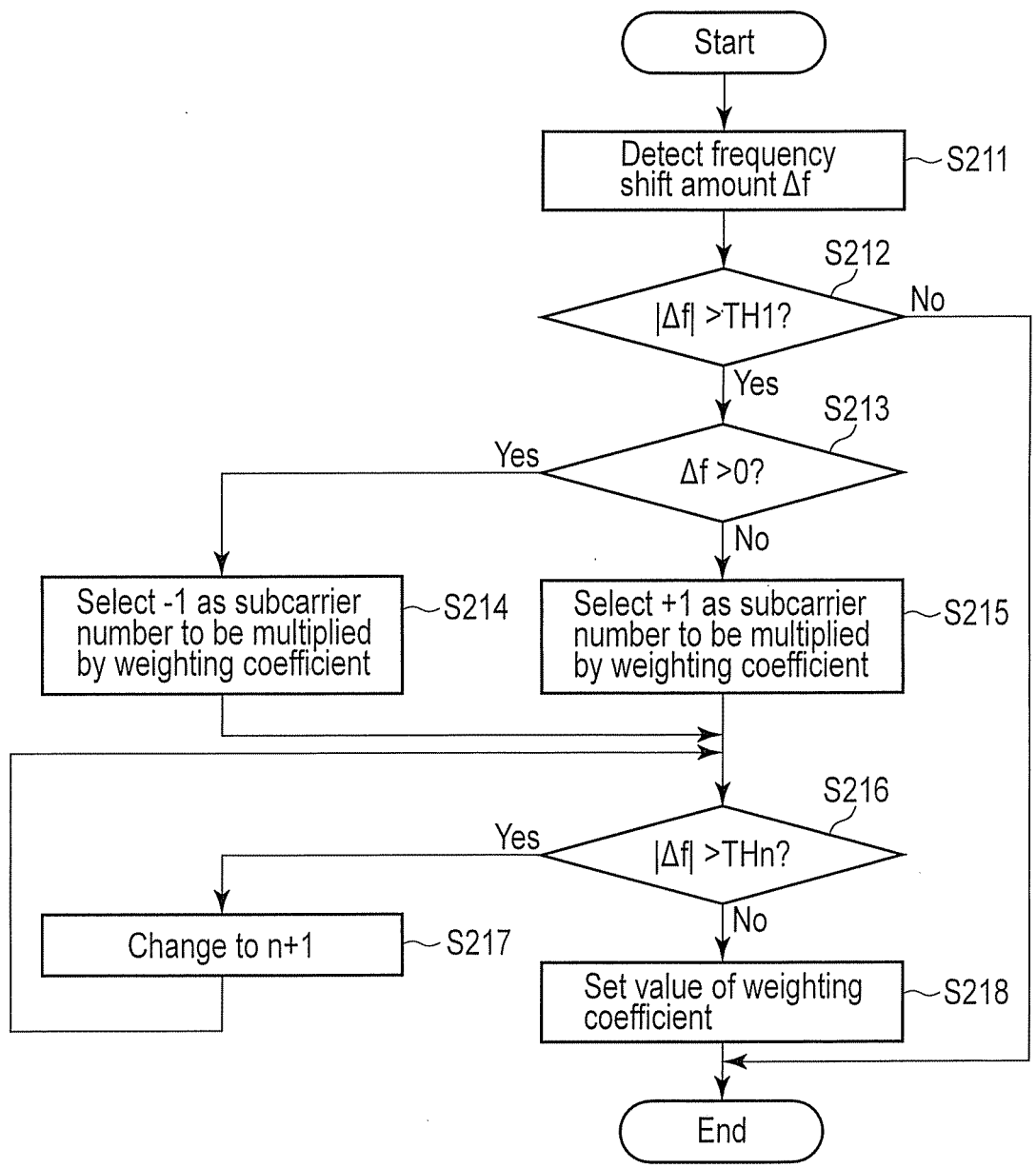
F I G. 10

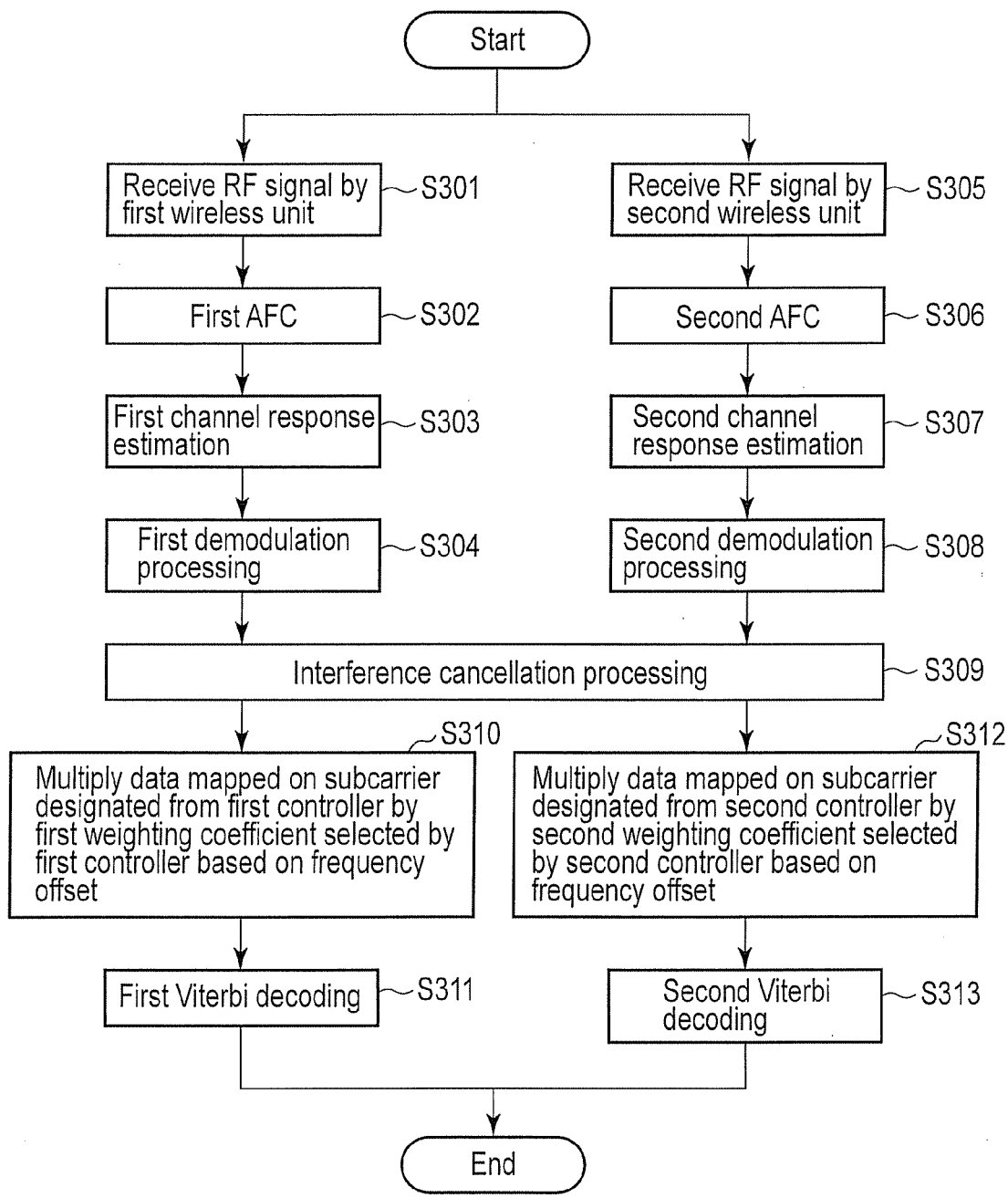
F I G. 15

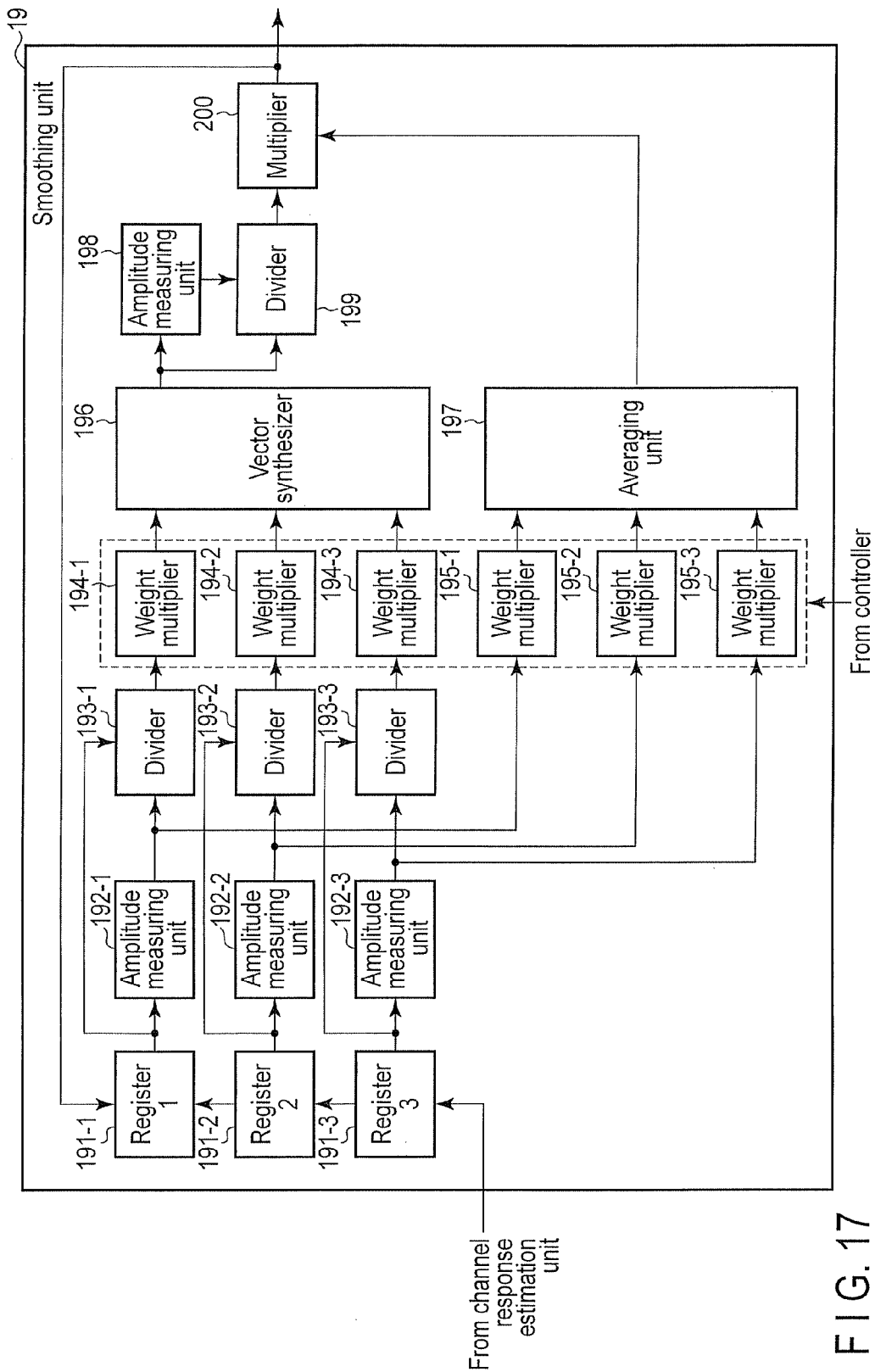
F I G. 17

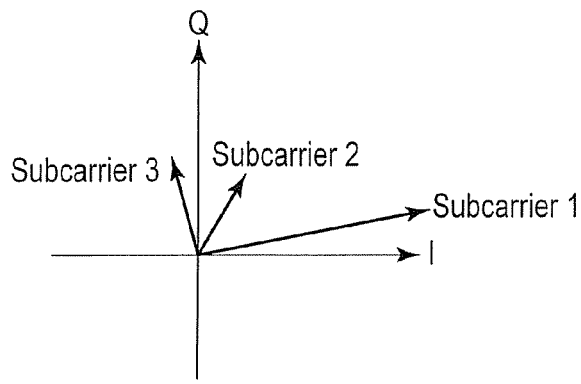
F I G. 18
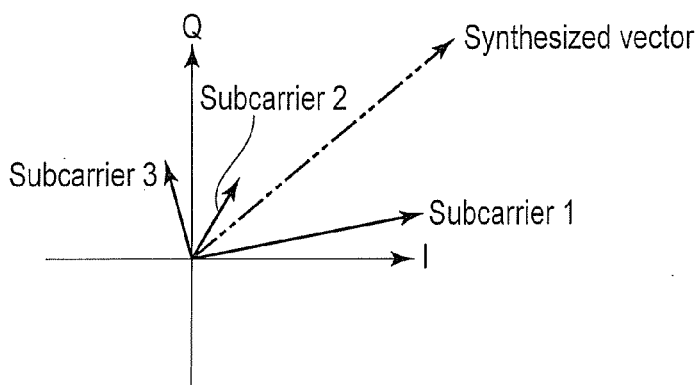
F I G. 19
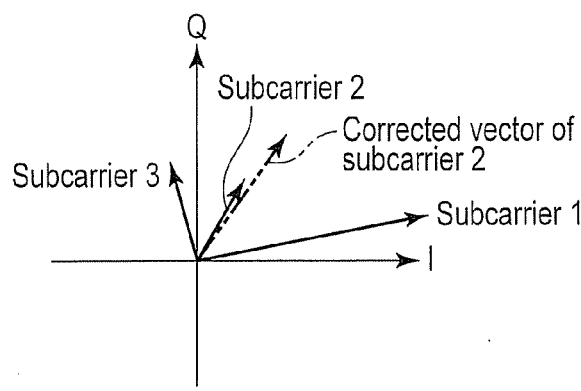
F I G. 21

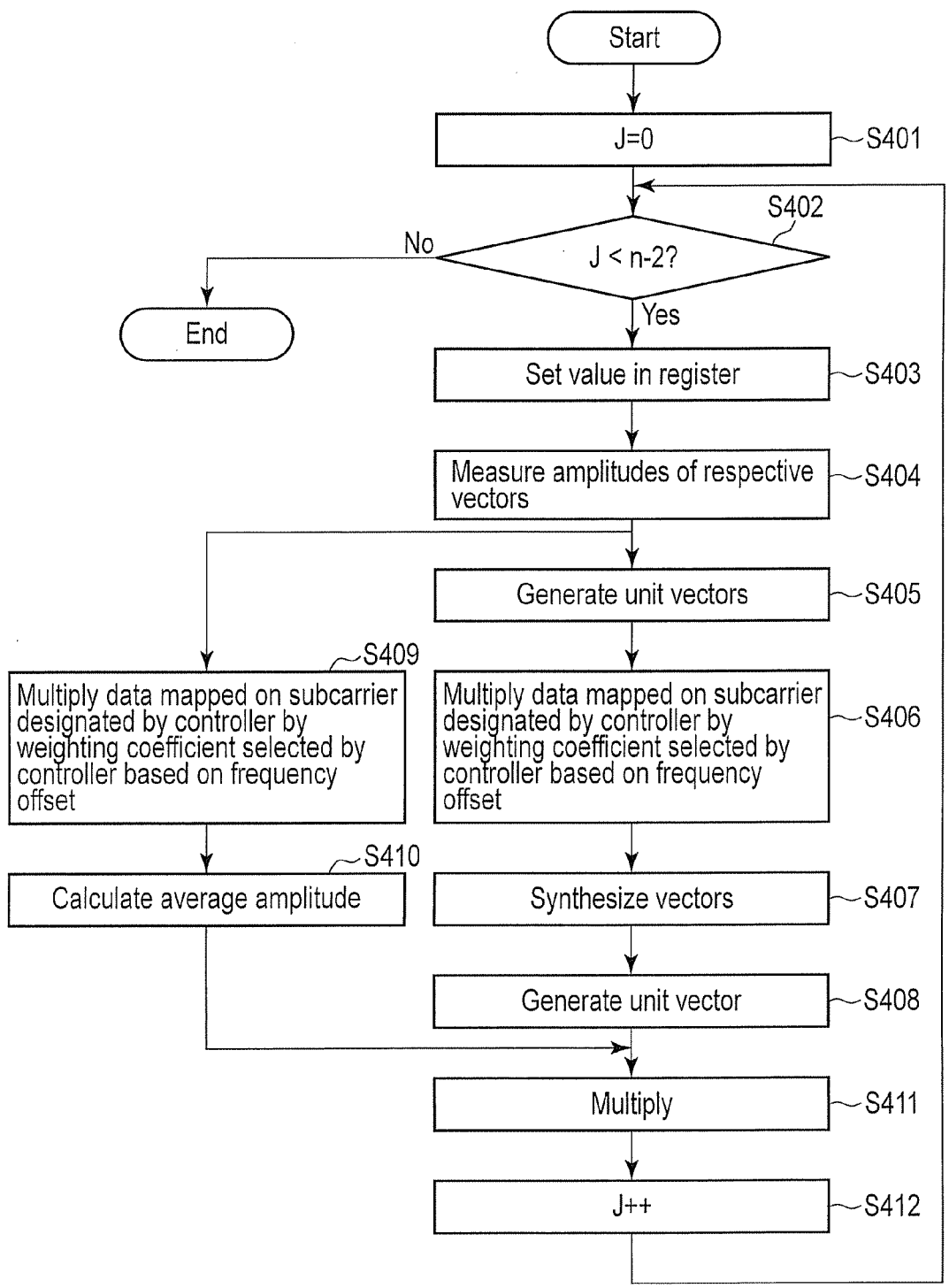
F I G. 20

US 8,649,452 B2

WIRELESS COMMUNICATION DEVICE

CROSS-REFERENCE TO RELATED APPLICATIONS

This application is based upon and claims the benefit of priority from prior Japanese Patent Application No. 2011-004150, filed Jan. 12, 2011, the entire contents of which are incorporated herein by reference.

FIELD

Embodiments described herein relate generally to a wireless communication device.

BACKGROUND

In general, a wireless terminal compliant with IEEE 802.11a receives an RF signal on a carrier in, for example, the 5-GHz band by a wireless unit through an antenna, and then converts the received signal into a baseband signal upon execution of signal processing.

Currently, a system used in the wireless unit includes a superheterodyne system, direct conversion system, and the like.

In case of the superheterodyne system, an RF signal received by an antenna is converted to an intermediate frequency (IF), and then undergoes gain control via an IF filter. After that, the signal having the frequency of the IF band is frequency-converted into a baseband signal, and is then converted into I and Q signals by a quadrature demodulator. At this time, in the quadrature demodulator, a direct current (DC) offset is generated, and is applied to the signals. However, since the received signal has undergone the gain control in the IF band, the DC offset is fixedly applied to the gain-controlled signals. For this reason, the wireless terminal can remove the DC offset by, for example, alternating current (AC) coupling. Hence, even when the DC offset is superposed, it does not impose any serious influence.

On the other hand, in a wireless terminal which adopts the direct conversion system, an RF signal is directly converted into a baseband signal. For this reason, no IF band exists, and the baseband signal is to undergo gain control.

That is, after a DC offset generated by the quadrature demodulator is applied to the received signal, that signal undergoes the gain control. Hence, a DC offset becomes variable according to the gain control amount of the baseband signal. For this reason, the wireless terminal which adopts the direct conversion system has to cancel the DC offset according to the gain control amount. However, especially in packet communications that suffer a frequency offset, the estimation precision of the DC offset is poor, and it is difficult to subtract the DC offset from the received signal.

Many use applications demand use of the direct conversion system which requires the smaller number of components than the superheterodyne system, and a measure against the aforementioned problem caused by the DC offset in the direct conversion method has to be taken.

The IEEE 802.11a standard adopts orthogonal frequency division multiplexing (OFDM). In the OFDM, information is transmitted using a plurality of subcarriers having orthogonal relationships. Such OFDM does not use any DC subcarrier which is seriously influenced by the aforementioned DC offset or a high-pass filter (HPF). For this reason, even when a DC (neighboring) component has varied due to the DC offset or HPF, a reception performance less deteriorates.

However, when a frequency offset exists, the influence of the DC offset or HPF often reaches subcarriers (valid subcarriers) other than the DC subcarrier. For this reason, the reception performance may deteriorate considerably.

BRIEF DESCRIPTION OF THE DRAWINGS

FIG. 6 is a graph showing a soft-decision value sequence as demodulator outputs when a data modulation system is QPSK;

FIG. 7 is a graph showing the soft-decision value sequence after a weighting coefficient is multiplied;

FIG. 9 is a flowchart showing a second operation example of the wireless LAN terminal in the wireless LAN system according to the first embodiment;

FIG. 10 is a flowchart showing a third operation example of the wireless LAN terminal in the wireless LAN system according to the first embodiment;

FIG. 15 is a flowchart showing a sixth operation example of the wireless LAN terminal in the wireless LAN system according to the second embodiment;

FIG. 17 is a block diagram showing the arrangement of a smoothing unit of the wireless LAN terminal shown in FIG. 16;

FIG. 18 is a graph showing an example of channel response estimated value vectors for subcarriers at the time of reception in the wireless LAN system according to the third embodiment;

FIG. 19 is a graph showing a comparison example of a correction value of the channel response estimated value vectors for the subcarriers shown in FIG. 18 in association with the third embodiment;

FIG. 20 is a flowchart showing a seventh operation example of the wireless LAN terminal in the wireless LAN system according to the third embodiment; and FIG. 21 is a graph showing a correction value of the channel response estimated value vectors for the subcarriers shown in FIG. 18 according to the third embodiment.

DETAILED DESCRIPTION

Figure 1:
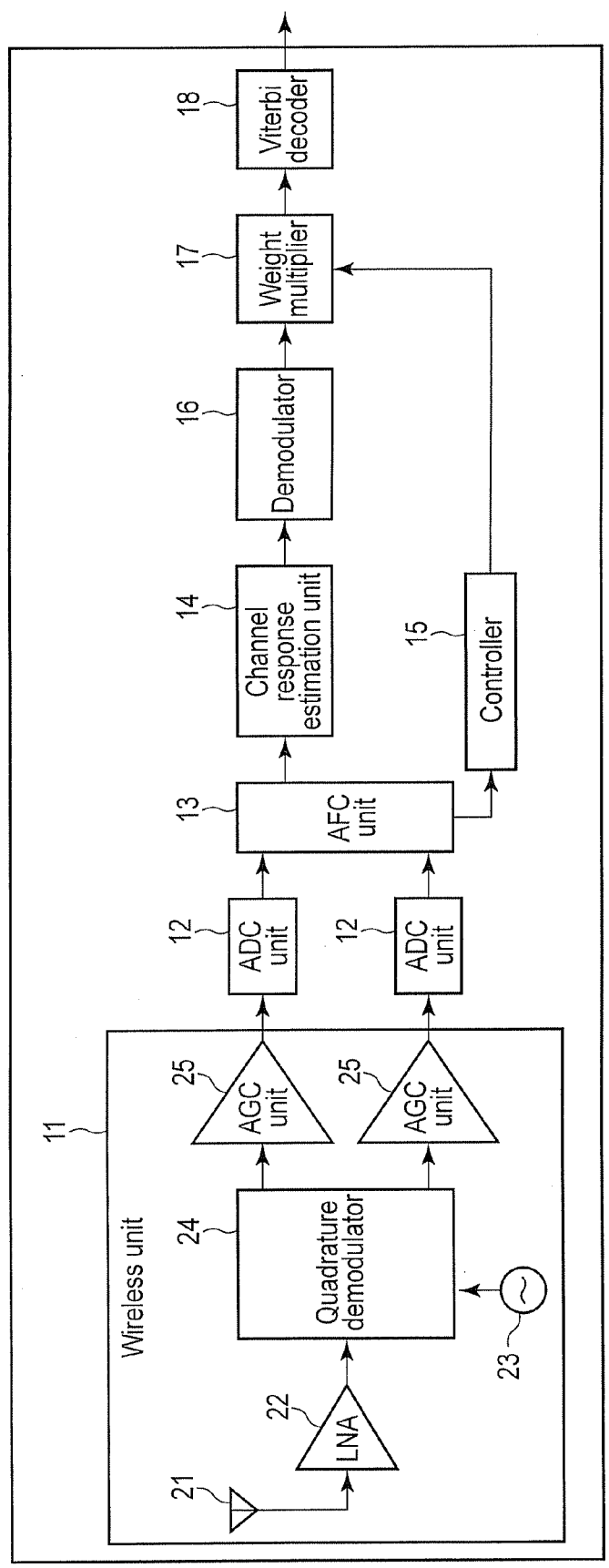
FIG. 1 is a block diagram showing the arrangement of a wireless LAN terminal in a wireless LAN system according to the first embodiment.

In general, according to one embodiment, a wireless communication device which comprises an automatic frequency controller which receives a signal OFDM-modulated using a plurality of subcarriers, and detects a radio frequency shift amount between transmitting and receiving sides, includes a controller, first weight multiplier, and error correction decoder. The controller designates subcarrier that suffers interference caused by a DC component based on the radio frequency shift amount between the transmitting and receiving sides which is detected by the automatic frequency controller. The first weight multiplier multiplies amplitude values of demodulated signals of signals carried by the subcarriers designated by the controller by a weighting coefficient in a range from 0 to 1. The error correction decoder performs error correction of the demodulated signals multiplied by the weighting coefficient by the first weight multiplier. The controller sets the weighting coefficient to be multiplied by the first weight multiplier based on the radio frequency shift amount between the transmitting and receiving sides.

Embodiments will be described hereinafter with reference to the drawings. The same reference numerals denote the same parts throughout the drawings.

First Embodiment

A wireless LAN terminal in a wireless LAN system according to the first embodiment will be described below with reference to FIGS. 1, 2, 3, 4, 5, 6, 7, 8A, 8B, 8C, 8D, 9, 10, 11, 12, and 13.

[Arrangement]

The arrangement of the wireless LAN terminal in the wireless LAN system according to the first embodiment will be described below with reference to FIGS. 1, 2, 3, and 4.

Figure 2:
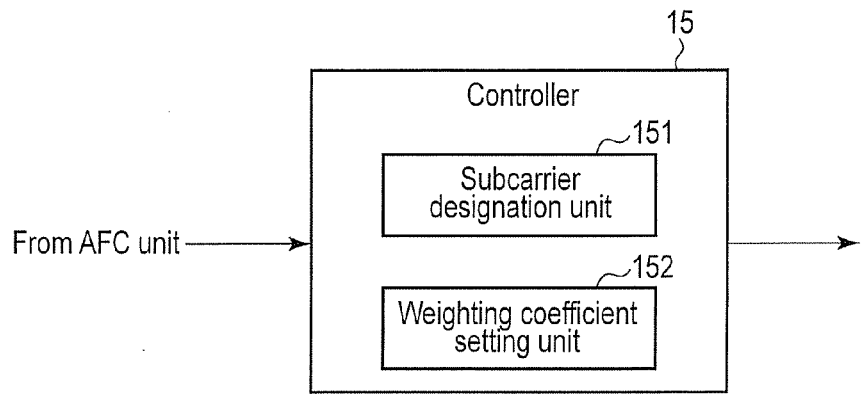
FIG. 2 is a block diagram showing the arrangement of a controller of the wireless LAN terminal shown in FIG. 1.
Figure 3:
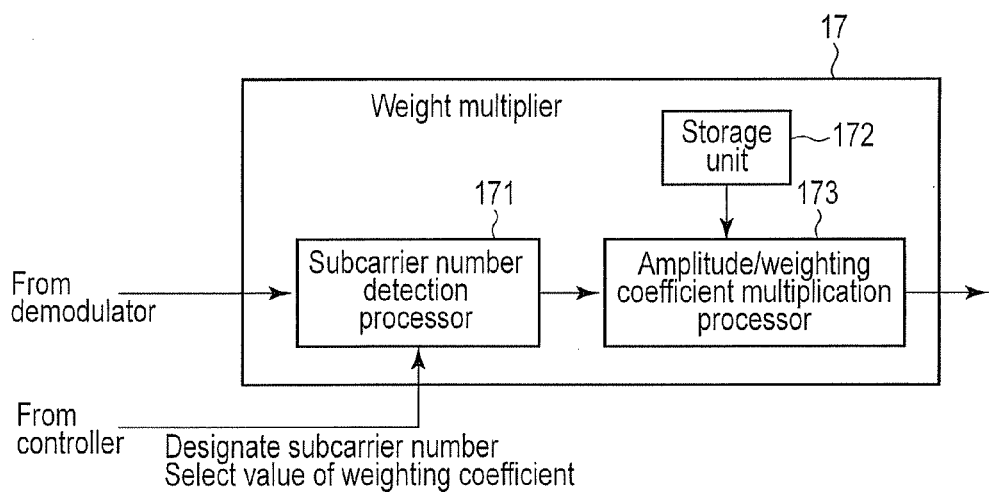
FIG. 3 is a block diagram showing the arrangement of a weight multiplier of the wireless LAN terminal shown in FIG. 1.
Figure 4:
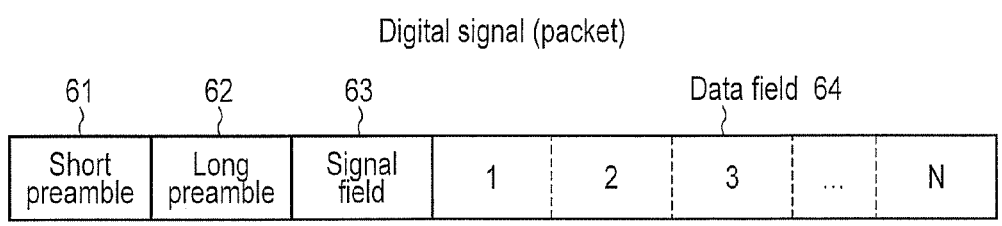
FIG. 4 is a view showing the format of a packet to be communicated in the wireless LAN system according to the first embodiment.

FIG. 1 is a block diagram of the wireless LAN terminal in the wireless LAN system according to the first embodiment. FIG. 2 is a block diagram of a controller of the wireless LAN terminal shown in FIG. 1. FIG. 3 is a block diagram of a weight multiplier of the wireless LAN terminal shown in FIG. 1. FIG. 4 shows the format of a digital signal (packet) communicated in the wireless LAN system which uses multi-carrier wireless transmission (OFDM).

In the first embodiment, the wireless LAN system uses multi-carrier wireless transmission (OFDM). Also, the wireless LAN system includes a plurality of wireless LAN terminals as an OFDM transmitter and OFDM receiver, and each terminal is configured to serve as a transmitting or receiving side. Note that when the wireless LAN terminal is used as only that on the transmitting or receiving side, it need only include corresponding functions.

Although not shown, the wireless LAN terminal serving as the transmitting side includes an error correction encoder. As the error correction encoder, for example, a convolution encoder or turbo encoder is used.

As shown in FIG. 1, the wireless LAN terminal serving as the receiving side includes a wireless unit 11, analog-to-digital conversion (ADC) units 12, auto frequency control (AFC) unit 13 as an automatic frequency controller, channel response estimation unit 14, controller 15, demodulator 16, weight multiplier 17, and Viterbi decoder 18 as an example of an error correction decoder. Since the error correction decoder is used in correspondence with the transmitting side, when a turbo encoder is used on the transmitting side, a turbo decoder is used in place of the Viterbi decoder 18.

The wireless unit 11 includes an antenna 21, low-noise amplifier (LNA) 22, local oscillator 23, quadrature demodulator 24, and auto gain control (AGC) units 25 as automatic gain controllers.

The local oscillator 23 generates a local oscillation signal (local signal [LO]) of a carrier frequency (radio frequency) for quadrature demodulation, and inputs the signal to the quadrature demodulator 24. The quadrature demodulator 24 is, for example, a mixer. The quadrature demodulator 24 quadrature-demodulates a received OFDM RF signal by the local signal LO to generate an OFDM baseband signal including an I component signal (I signal) and Q component signal (Q signal), and outputs the I and Q signals to the respective AGC units 25. The AGC units 25 apply gain control to the input signals to predetermined levels, and output them to the ADC units 12.

That is, the wireless unit 11 converts an RF signal received by the antenna 21 into a baseband signal by the direct conversion system.

The ADC units 12 respectively convert the I and Q signals input from the wireless unit 11 into digital signals, and output the digital signals to the AFC unit 13.

The AFC unit 13 applies coarse AFC using short preambles 61 included in the digital signals input from the ADC units 12, thereby obtaining a frequency offset. The AFC unit 13 applies high-precision AFC using long preambles 62 to obtain a frequency offset.

The channel response estimation unit 14 estimates a distortion of the received signal in a transmission path using the long preamble 62 included in the digital signal.

The demodulator 16 applies FFT processing to the received signal to convert it onto a frequency axis, and demodulates the converted signal using the transmission response estimated value, thus generating data signals (demodulated signals) mapped on subcarriers of respective frequencies. "FFT" is short for "fast Fourier cosine/sine transform". Note that the number of FFT output data is 64 (values), the number of valid data of the output data is 52 (values), and they correspond to subcarrier numbers −26, −25, . . . , −2, −1, +1, +2, . . . , +25, and +26.

The weight multiplier 17 multiplies the data signals input from the demodulator 16 by a pre-set weighting coefficient A in accordance with an instruction from the controller 15. The data signals of subcarriers designated by the controller 15 are multiplied by weighting coefficient A within a range of $0 < A < 1$. Weighting coefficient A assumes a smaller value as a subcarrier is closer to a DC offset position, and assumes a larger value as it is farther from the DC offset position. Note that the DC offset position is a position of a DC voltage generated when the local signal LO leaks and is mixed with itself.

The Viterbi decoder 18 performs error correction of the data signals output from the weight multiplier 17, and outputs the error-corrected data signals.

The controller 15 includes a subcarrier designation unit 151 and weighting coefficient setting unit 152, as shown in FIG. 2.

The subcarrier designation unit 151 reads a frequency offset value (radio frequency shift amount) detected by the AFC unit 13, that is, a carrier frequency shift detection value (referred to as a frequency shift amount Δf hereinafter), decides subcarrier numbers to be weighted according to that value, and notifies the weight multiplier 17 of the decided subcarrier numbers.

The weighting coefficient setting unit 152 selects weighting coefficient A within the range of 0<A<1 according to the frequency shift amount Δf detected by the AFC unit 13, and notifies the weight multiplier 17 of the selected coefficient. More specifically, the weighting coefficient setting unit 152 selects a smaller weighting coefficient A as the absolute value of the frequency shift amount Δf is larger, and selects a larger weighting coefficient A as the absolute value of the frequency shift amount Δf is smaller. Also, even when the absolute value of the frequency shift amount Δf remains the same, the weighting coefficient setting unit 152 selects a different weighting coefficient A depending on whether the amount is positive or negative. In other words, a function between the frequency shift amount Δf and weighting coefficient A is asymmetric on the positive and negative sides.

The weight multiplier 17 includes a subcarrier number detection processor 171, storage unit 172, and amplitude/weighting coefficient multiplication processor 173, as shown in FIG. 3.

The subcarrier number detection processor 171 detects on which of subcarriers input data are mapped.

The storage unit 172 pre-stores a plurality of weighting coefficients to be multiplied with amplitude values of data signals.

The amplitude/weighting coefficient multiplication processor 173 multiplies amplitude values of data signals, which are mapped on subcarriers of subcarrier numbers designated by the controller 15, of those input from the demodulator 16 by the weighting coefficient pre-stored in the storage unit 172. At this time, the amplitude/weighting coefficient multiplication processor 173 multiplies amplitudes of data signals by the weighting coefficient selected by the controller 15 based on the frequency shift amount Δf the plurality of weighting coefficients pre-stored in the storage unit 172.

As shown in FIG. 4, a digital signal has a short preamble 61, long preamble 62, signal field 63, and a plurality of data fields 64.

The short preamble 61 is located at a head position of a packet to be transmitted, and is used to execute gain control and coarse AFC. The long preamble 62 is used to execute channel response estimation and AFC. The signal field 63 includes information of a data rate and data length.

First Operation Example

A first operation example of the wireless LAN terminal in the wireless LAN system according to the first embodiment will be described below with reference to FIGS. 5, 6, and 7.

Figure 5:
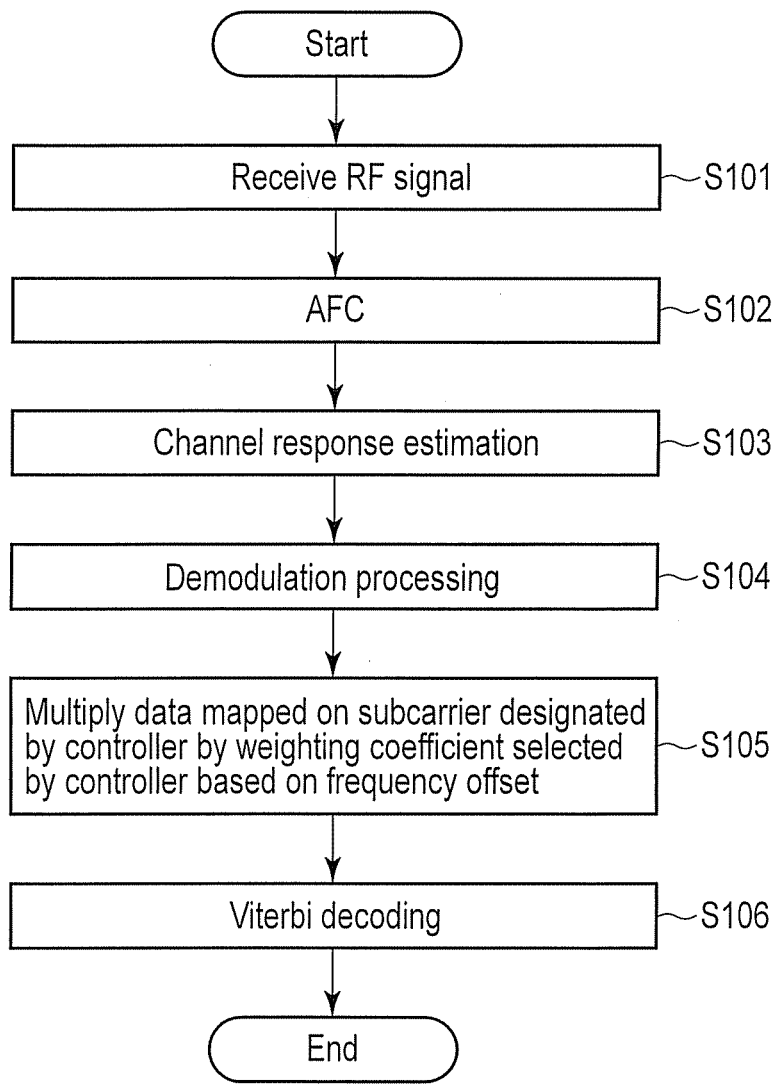
FIG. 5 is a flowchart showing a first operation example of the wireless LAN terminal in the wireless LAN system according to the first embodiment.

FIG. 5 is a flowchart of the first operation example of the wireless LAN terminal. FIG. 6 shows an example of demodulator outputs when a data modulation system, is, for example, QPSK, and data positions corresponding to subcarrier numbers ±1 at that time. FIG. 7 shows multiplication results of the demodulator outputs shown in FIG. 6 by the weighting coefficient (<1).

As shown in FIG. 5, in the wireless LAN terminal on the receiving side, the wireless unit 11 begins to receive an RF signal transmitted from another wireless LAN terminal (step S101).

Upon reception of the RF signal, the wireless unit 11 converts the RF signal received by the antenna 21 into a baseband signal by quadrature demodulation. At this time, a DC offset is applied to I and Q axes of the quadrature-demodulated baseband signal. I and Q signals applied with the DC offset are input to the ADC units 12 and are converted into digital signals, which are then output to the AFC unit 13.

Next, the AFC unit 13 applies coarse AFC using short preambles 61 of the input digital signals. Also, the AFC unit 13 executes high-precision AFC using long preambles 62 of the digital signals (step S102).

Since the long preamble 62 of the digital signal is a given signal, the channel response estimation unit 14 performs channel response estimation using this long preamble 62 (step S103).

Next, the demodulator 16 demodulates data fields 64 (data parts) of the digital signal (step S104). More specifically, the demodulator 16 extracts data to be input to FFT from the received digital signal, converts them from time-axis signals into frequency-axis signals, and multiplies these signals by conjugate complex numbers of channel response estimated values. After that, the demodulated digital signals are output to the weight multiplier 17.

The weight multiplier 17 then multiplies the data (soft-decision value sequence) input from the demodulator 16 by the weighting coefficient in accordance with an instruction from the controller 15 (step S105). In this operation example, data mapped on subcarriers of subcarrier numbers ±1 are multiplied by weighting coefficient A (0<A<1) stored in the storage unit 172. At this time, weighting coefficient A selected by the controller 15 based on the frequency shift amount Δf of the plurality of weighting coefficients A stored in the storage unit 172 is multiplied.

The number of data mapped per subcarrier is 1 when data modulation is BPSK, 2 when it is QPSK, 4 when it is 16QAM, and 6 when it is 64QAM. For this reason, the number of data per subcarrier to be multiplied by the weighting coefficient varies depending on the data modulation system of a received packet.

As shown in FIG. 6, in case of, for example, QPSK, two pieces of information are mapped per subcarrier. For this reason, the number of data 51 mapped on a subcarrier of a subcarrier number −1 is 2, and the number of data 52 mapped on a subcarrier of a subcarrier number +1 is 2. Therefore, amplitude values of these four data 51 and 52 are multiplied by weighting coefficient A. In this case, 0<A<1.

As a result of this multiplication, as shown in FIG. 7, the amplitude values of the four data 51 and 52 become smaller values. After that, the digital signals multiplied by weighting coefficient A are output from the weight multiplier 17 to the Viterbi decoder 18, which performs error correction (step S106). Then, the error-corrected data are output.

Since the IEEE 802.11a standard includes a rule indicating that a frequency error is 20 ppm or less, a maximum frequency error is 118 kHz. A maximum shift occurs when the frequency is shifted by 118 kHz in both the wireless LAN terminals on the transmitting and receiving sides. To combine these shifts, a frequency shift up to 236 kHz twice of the maximum frequency error is permitted. Since a subcarrier interval is 312.5 kHz, a DC offset falls between subcarrier numbers −1 and +1. Therefore, subcarriers of subcarrier numbers ±1 are most influenced by interference.

After the weighting coefficient is multiplied, as for error-corrected data of the subcarriers of the subcarrier numbers ±1, which are interfered with by a DC offset, reliabilities upon error correction are lower. Therefore, even when the frequency shift amount Δf is large, they are hardly influenced by the interference of the DC offset.

The reason why the DC offset causes the interference will be described below with reference to FIGS. 8A, 8B, 8C, and 8D.

Figure 8A:
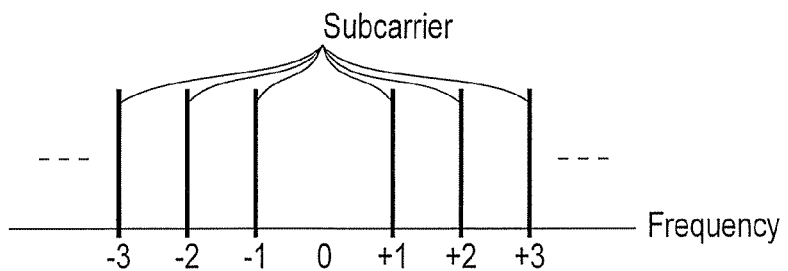
FIG. 8A is a view showing subcarriers at the time of transmission in the wireless LAN system according to the first embodiment.

FIG. 8A is a view of subcarriers when the wireless LAN terminal on the transmitting side transmits a packet, and data are carried on subcarriers of subcarrier numbers −26, −25, . . . , −1, +1, . . . , +25, and +26. Note that a subcarrier of a subcarrier number 0 (DC subcarrier) is not used.

Figure 8B:
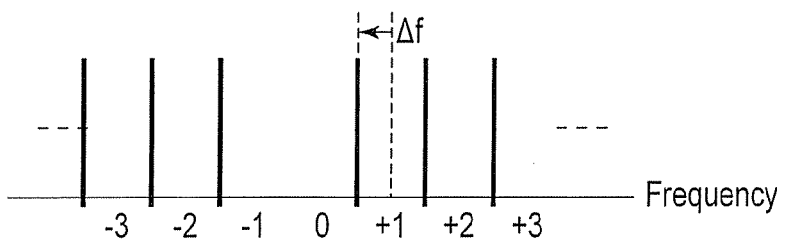
FIG. 8B is a view showing subcarriers which suffer a frequency shift at the time of reception in the wireless LAN system according to the first embodiment.

As shown in FIG. 8B, when a frequency error Δf exists between the wireless LAN terminals on the transmitting and receiving sides, a frequency is wholly shifted by Δf in the wireless LAN terminal on the receiving side.

That is, letting ft be the carrier frequency of a transmitting signal in the wireless LAN terminal on the transmitting side, and fr be the carrier frequency in the wireless LAN terminal on the receiving side, Δf=ft−fr.

Figure 8C:
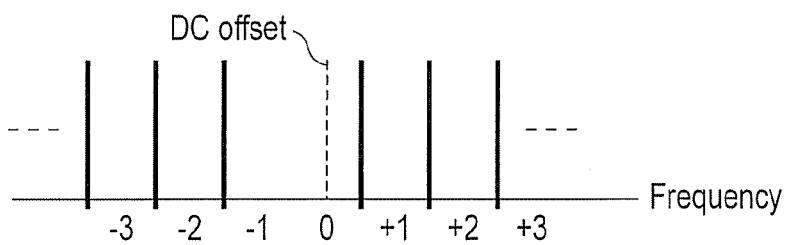
FIG. 8C is a view showing subcarriers to which a DC offset is applied at the time of reception in the wireless LAN system according to the first embodiment.

Then, as shown in FIG. 8C, when the wireless unit 11 (quadrature demodulator 24) of the wireless LAN terminal on the receiving side generates a DC offset, a DC component appears at the position of the subcarrier of the subcarrier number 0.

Figure 8D:
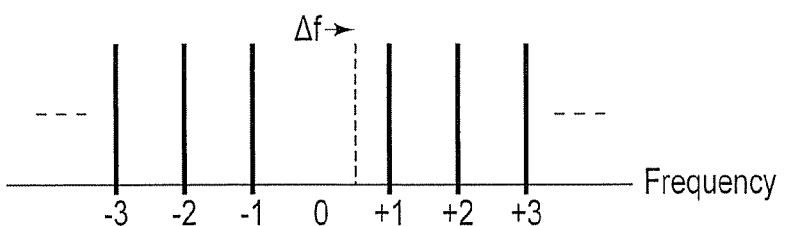
FIG. 8D is a view showing subcarriers after AFC at the time of reception in the wireless LAN system according to the first embodiment.

After that, when digital signals in which the DC component has appeared are output from the wireless unit 11 and are input to the AFC unit 13 via the ADC units 12, the AFC unit 13 applies AFC to these digital signals. Thus, as shown in FIG. 8D, subcarriers of subcarrier numbers −26, −25, . . . , −1, +1, . . . , +25, and +26 are returned to original frequency positions.

On the other hand, the DC offset is converted into a frequency component of −Δf as a result of the AFC of the AFC unit 13, and orthogonal relationships with other subcarriers are broken. For this reason, the DC offset component becomes an interference component to other subcarriers.

As described above, subcarriers close to the DC component are especially interfered with by the DC offset component. That is, in the wireless LAN terminal compliant with the IEEE 802.11a standard, subcarriers of the subcarrier numbers ±1 are most influenced by the DC offset.

The Viterbi decoder 18 performs soft-decision decoding, and calculates so that a signal having a larger amplitude has a higher reliability than a signal having a smaller amplitude.

Therefore, in consideration of low reliabilities of the subcarriers of the subcarrier numbers ±1 due to the influence of the interference, the amplitude values of corresponding data are multiplied by weighting coefficient A (<1) in advance. That is, data mapped on the subcarriers of the subcarrier numbers ±1 undergo Viterbi decoding by purposely lowering their reliabilities. Thus, when the DC offset is applied, the error correction reliability can be improved.

In the first operation example, data mapped on the subcarriers of the subcarrier numbers ±1 are always multiplied by the selected weighting coefficient. By contrast, practical selection method examples of the weighting coefficient, and operation examples of multiplying subcarriers other than those of the subcarrier numbers ±1 by the weighting coefficient will be described below.

Second Operation Example

A second operation example of the wireless LAN terminal in the wireless LAN system according to the first embodiment will be described below with reference to FIG. 9.

FIG. 9 is a flowchart of the second operation example of the wireless LAN terminal.

As shown in FIG. 9, in this second operation example, the AFC unit 13 detects a frequency shift amount Δf, and notifies the controller 15 of it (step S201).

The controller 15 then compares the absolute value of the detected frequency shift amount Δf with a threshold frequency TH1 which is set in advance in itself (step S202).

If it is determined in step S202 that the absolute value of the frequency shift amount Δf is greater than threshold frequency TH1 (Yes in step S202), the controller 15 decides that data mapped on subcarriers of subcarrier numbers ±1 are multiplied by the weighting coefficient (step S203).

Next, the controller 15 compares the absolute value of the detected frequency shift amount Δf with a threshold frequency THn (n is an integer greater than or equal to 2: TH1<TH2<TH3< . . . ), which is set in advance in itself (step S204).

If it is determined in step S204 that the absolute value of the frequency shift amount Δf is greater than threshold frequency THn (Yes in step S204), the controller 15 changes threshold frequency THn to a threshold frequency THn+1 (step S205), and compares the absolute value of the frequency shift amount Δf with threshold frequency THn+1, which is set in advance in itself. That is, step S204 is repeated until the absolute value of the frequency shift amount Δf becomes smaller than threshold frequency THn.

If it is determined in step S204 that the absolute value of the frequency shift amount Δf is smaller than threshold frequency THn (No in step S204), the controller 15 sets weighting coefficient A according to threshold frequency THn at that time (step S206). That is, weighting coefficient A is set based on the frequency shift amount Δf. Note that the configuration in this case sets weighting coefficient A by repetitively comparing the frequency shift amount Δf and threshold frequency THn. Alternatively, a configuration which sets weighting coefficient A by looking up a conversion table which stores the frequency shift amounts Δf and weighting coefficients A in association with each other may be adopted. At this time, weighting coefficient A becomes smaller with increasing threshold frequency THn, and larger with decreasing threshold frequency THn. Also, even when the absolute value of the frequency shift amount Δf remains the same, a different weighting coefficient A is selected depending on whether the frequency shift amount Δf is positive or negative.

On the other hand, if it is determined in step S202 that the absolute value of the frequency shift amount Δf is smaller than threshold frequency TH1 (No in step S202), the second operation ends without multiplying the data of the subcarriers by weighting coefficient A. Note that, for example, the data of the subcarriers may be multiplied by 1 as weighting coefficient A, in addition to the method which does not multiply the data by weighting coefficient A.

Third Operation Example

A third operation example of the wireless LAN terminal in the wireless LAN system according to the first embodiment will be described below with reference to FIG. 10.

FIG. 10 is a flowchart of the third operation example of the wireless LAN terminal.

As shown in FIG. 10, in this third operation example, the AFC unit 13 detects a frequency shift amount Δf, and notifies the controller 15 of it (step S211).

The controller 15 then compares the absolute value of the detected frequency shift amount Δf with a threshold frequency TH1 which is set in advance in itself (step S212).

If it is determined in step S212 that the absolute value, of the frequency shift amount $\Delta f$ is greater than threshold frequency TH1 (Yes in step S212), the controller 15 checks whether or not the frequency shift amount $\Delta f$ is greater than zero (step S213) to decide that only data of a number corresponding to the sign of $\Delta f$ is to be weighted in place of subcarriers of subcarrier numbers ±1.

For example, if $\Delta f > 0$ (Yes in step S213), the controller 15 decides that only data mapped on a subcarrier of a subcarrier number −1 is multiplied by the weighting coefficient (step S214); if $\Delta f < 0$ (No in step S213), it decides that only data mapped on a subcarrier of a subcarrier number +1 is multiplied by the weighting coefficient (step S215).

Next, the controller 15 compares the absolute value of the detected frequency shift amount $\Delta f$ with a threshold frequency THn (n is an integer greater than or equal to 2: TH1<TH2<TH3<...), which is set in advance in itself (step S216).

If it is determined in step S216 that the absolute value of the frequency shift amount $\Delta f$ is greater than threshold frequency THn (Yes in step S216), the controller 15 changes threshold frequency THn to a threshold frequency THn+1 (step S217), and compares the absolute value of the frequency shift $\Delta f$ with threshold frequency THn+1, which is set in advance in itself. That is, step S216 is repeated until the absolute value of the frequency shift amount $\Delta f$ becomes smaller than threshold frequency THn.

If it is determined in step S216 that the absolute value of the frequency shift amount $\Delta f$ is smaller than threshold frequency THn (No in step S216), the controller 15 sets weighting coefficient A according to threshold frequency THn at that time (step S218). That is, weighting coefficient A is set based on the frequency shift amount $\Delta f$. Note that the configuration in this case sets weighting coefficient A by repetitively comparing the frequency shift amount $\Delta f$ and threshold frequency THn. Alternatively, a configuration which sets weighting coefficient A by looking up a conversion table which stores the frequency shifts $\Delta f$ and weighting coefficients A in association with each other may be adopted. At this time, weighting coefficient A becomes smaller with increasing threshold frequency THn, and it becomes larger with decreasing threshold frequency THn. Also, even when the absolute value of the frequency shift amount $\Delta f$ remains the same, a different weighting coefficient A is selected depending on whether the frequency shift amount $\Delta f$ is positive or negative.

On the other hand, if it is determined in step S212 that the absolute value of the frequency shift amount $\Delta f$ is smaller than threshold frequency TH1 (No in step S212), the third operation ends without multiplying the data of the subcarriers by weighting coefficient A. Note that, for example, the data of the subcarriers may be multiplied by 1 as weighting coefficient A, in addition to the method which does not multiply the data by weighting coefficient A.

Fourth Operation Example

A fourth operation example of the wireless LAN terminal in the wireless LAN system according to the first embodiment will be described below with reference to FIG. 11.

Figure 11:
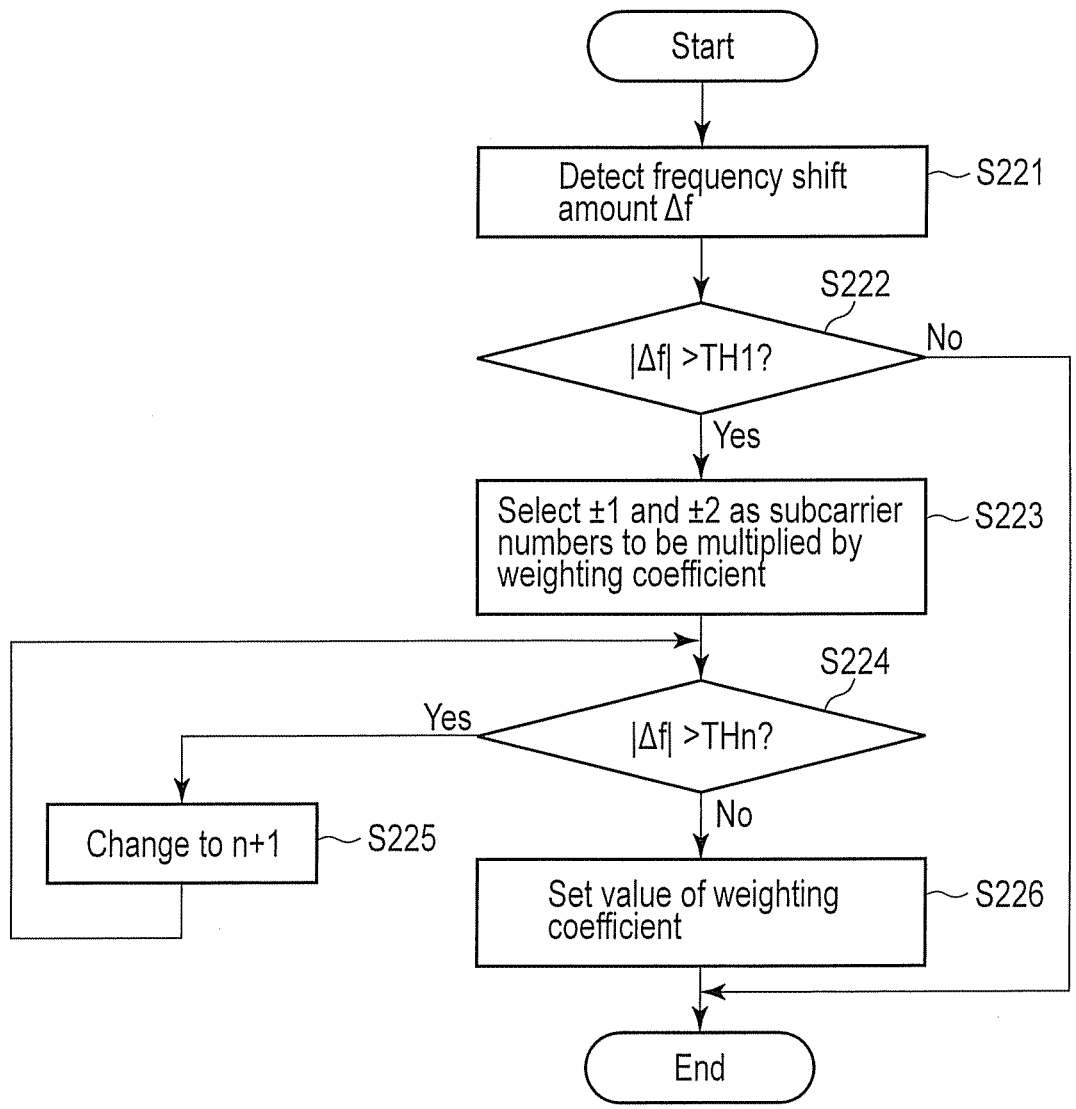
FIG. 11 is a flowchart showing a fourth operation example of the wireless LAN terminal in the wireless LAN system according to the first embodiment.

FIG. 11 is a flowchart of the fourth operation example of the wireless LAN terminal.

As shown in FIG. 11, in this fourth operation example, the AFC unit 13 detects a frequency shift amount $\Delta f$, and notifies the controller 15 of it (step S221).

The controller 15 then compares the absolute value of the detected frequency shift amount $\Delta f$ with a threshold frequency TH1 which is set in advance in itself (step S222).

If it is determined in step S222 that the absolute value of the frequency shift amount $\Delta f$ is greater than threshold frequency TH1 (Yes in step S222), the controller 15 decides that data mapped not only on subcarriers of subcarrier numbers ±1 but also on those of subcarrier numbers ±2 are multiplied by the weighting coefficient (step S223).

Next, the controller 15 compares the absolute value of the detected frequency shift amount $\Delta f$ with a threshold frequency THn (n is an integer greater than or equal to 2: TH1<TH2<TH3<...), which is set in advance in itself (step S224).

If it is determined in step S224 that the absolute value of the frequency shift amount $\Delta f$ is greater than threshold frequency THn (Yes in step S224), the controller 15 changes threshold frequency THn to a threshold frequency THn+1 (step S225), and compares the absolute value of the frequency shift amount $\Delta f$ with threshold frequency THn+1, which is set in advance in itself. That is, step S224 is repeated until the absolute value of the frequency shift amount $\Delta f$ becomes smaller than threshold frequency THn.

If it is determined in step S224 that the absolute value of the frequency shift amount $\Delta f$ is smaller than threshold frequency THn (No in step S224), the controller 15 sets a value of weighting coefficient A according to threshold frequency THn at that time (step S226). That is, weighting coefficient A is set based on the frequency shift amount $\Delta f$. Note that the configuration in this case sets weighting coefficient A by repetitively comparing the frequency shift amount $\Delta f$ and threshold frequency THn. Alternatively, a configuration which sets weighting coefficient A by looking up a conversion table which stores the frequency shift amounts $\Delta f$ and the values of weighting coefficient A in association with each other may be adopted. At this time, weighting coefficient A becomes smaller with increasing threshold frequency THn, and it becomes larger with decreasing threshold frequency THn. Also, even when the absolute value of the frequency shift amount $\Delta f$ remains the same, a different weighting coefficient A is selected depending on whether the frequency shift $\Delta f$ is positive or negative.

On the other hand, if it is determined in step S222 that the absolute value of the frequency shift $\Delta f$ is smaller than threshold frequency TH1 (No in step S222), the fourth operation ends without multiplying the data of the subcarriers by weighting coefficient A. Note that, for example, the data of the subcarriers may be multiplied by 1 as weighting coefficient A, in addition to the method which does not multiply the data by weighting coefficient A.

Fifth Operation Example

A fifth operation example of the wireless LAN terminal in the wireless LAN system according to the first embodiment will be described below with reference to FIG. 12.

Figure 12:
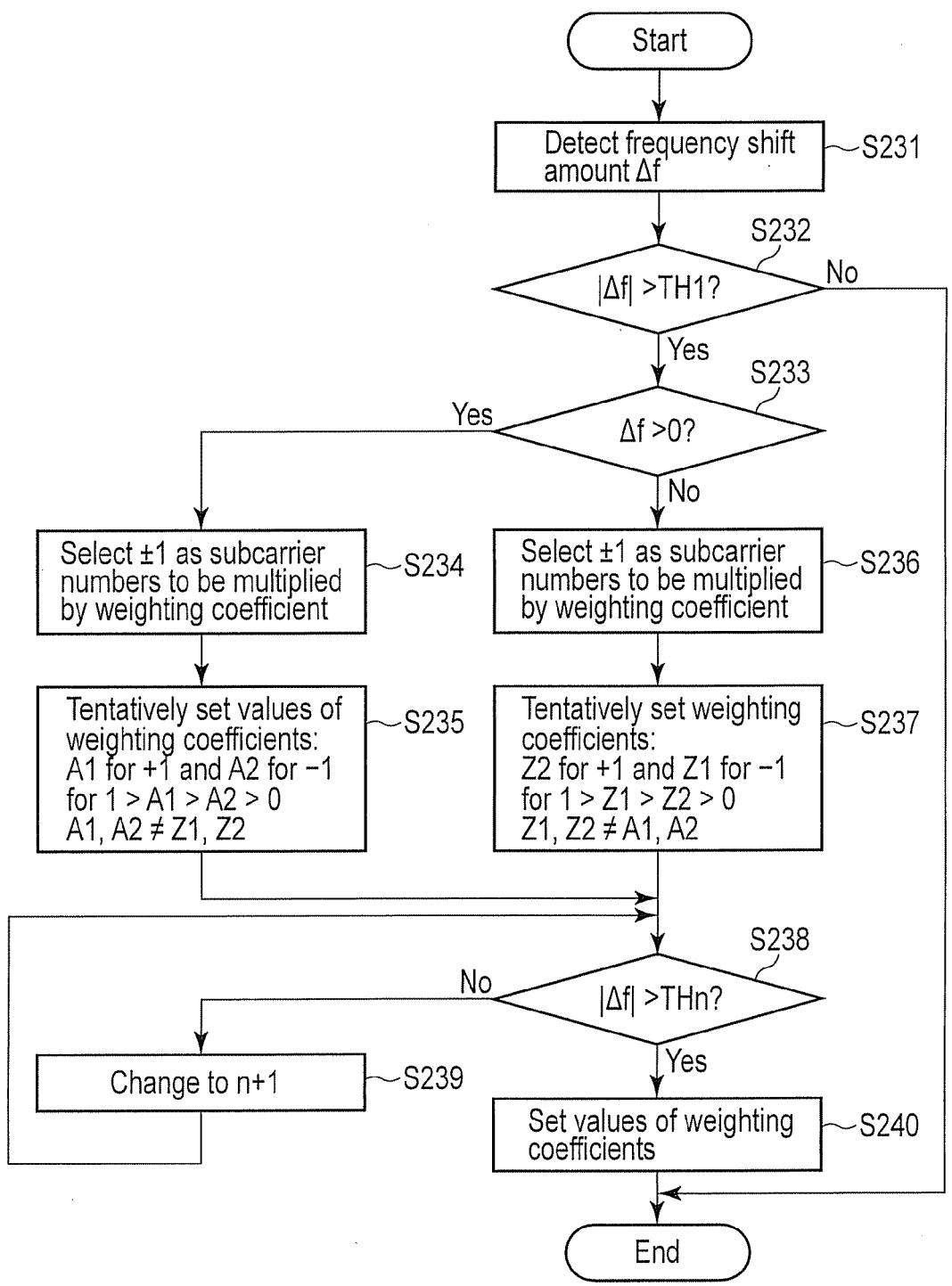
FIG. 12 is a flowchart showing a fifth operation example of the wireless LAN terminal in the wireless LAN system according to the first embodiment.

FIG. 12 is a flowchart of the fifth operation example of the wireless LAN terminal.

As shown in FIG. 12, in this fifth operation example, the AFC unit 13 detects a frequency shift amount $\Delta f$, and notifies the controller 15 of it (step S231).

The controller 15 then compares the absolute value of the detected frequency shift amount $\Delta f$ with a threshold frequency TH1 which is set in advance in itself (step S232).

If it is determined in step S232 that the absolute value of the frequency shift amount $\Delta f$ is greater than threshold frequency TH1 (Yes in step S232), the controller 15 checks whether or not the frequency shift amount $\Delta f$ is greater than zero (step S233) to decide subcarrier numbers to be multiplied by the weighting coefficients depending on this checking result (step S234 or S236), and to tentatively select weighting coefficients suited to the decided subcarrier numbers from those, which are stored in advance in itself (step S235 or S237).

For example, if the frequency shift amount $\Delta f>0$ (Yes in step S233), the controller 15 decides that subcarriers of subcarrier numbers ±1 are to be multiplied by weighting coefficients (step S234), and tentatively sets to respectively multiply data mapped on the decided subcarrier of the subcarrier number +1 by a first weighting coefficient A1 and data mapped on the decided subcarrier of the subcarrier number −1 by a second weighting coefficient A2 (step S235). In this case, assume that a range of the values of the weighting coefficients is that in which a relationship 1>A1>A2>0 holds.

On the other hand, if the frequency shift amount $\Delta f<0$ (No in step S233), the controller 15 decides that subcarriers of subcarrier numbers ±1 are to be multiplied by weighting coefficients (step S236), and tentatively sets to respectively multiply data mapped on the decided subcarrier of the subcarrier number +1 by a third weighting coefficient Z2 and data mapped on the decided subcarrier of the subcarrier number −1 by a fourth weighting coefficient Z1 (step S237). In this case, assume that a range of the values of the weighting coefficients is that in which a relationship 1>Z1>Z2>0 holds. Furthermore, a relationship Z1, Z2≠A1, A2 holds. In other words, {A1=Z1 and A2=Z2} do not hold (A1 and A2 are different from Z1 and Z2), and {A1=Z2 and A2=Z1} do not hold (A1 and A2 are asymmetric to Z1 and Z2). That is, A1 and A2, and Z1 and Z2 are not symmetrically replaced values.

That is, depending on whether or not the frequency shift amount $\Delta f$ is greater than zero, it is set to multiply the subcarriers of the subcarrier numbers ±1 by different weighting coefficients.

Next, the controller 15 compares the absolute value of the detected frequency shift amount $\Delta f$ with a threshold frequency THn (n is an integer greater than or equal to 2: TH1<TH2<TH3<...), which is set in advance in itself (step S238).

If it is determined in step S238 that the absolute value of the frequency shift amount $\Delta f$ is greater than threshold frequency THn (Yes in step S238), the controller 15 changes threshold frequency THn to a threshold frequency THn+1 (step S239), and compares the absolute value of the frequency shift $\Delta f$ with threshold frequency THn+1, which is set in advance in itself. That is, step S238 is repeated until the absolute value of the frequency shift amount $\Delta f$ becomes smaller than threshold frequency THn.

If it is determined in step S238 that the absolute value of the frequency shift amount $\Delta f$ is smaller than threshold frequency THn (No in step S238), the controller 15 sets values of weighting coefficients A1 and A2 (Z1 and Z2) according to threshold frequency THn at that time (step S240). That is, the values of weighting coefficients A1 and A2 (Z1 and Z2) are set based on the frequency shift amount $\Delta f$. Note that the configuration in this case sets the values of weighting coefficients by repetitively comparing the frequency shift amount $\Delta f$ and threshold frequency THn. Alternatively, a configuration which sets the values of weighting coefficients by looking up a conversion table which stores the frequency shifts $\Delta f$ and the values of weighting coefficients in association with each other may be adopted. At this time, the values of weighting coefficients A1 and A2 (Z1 and Z2) become smaller with increasing threshold frequency THn, and they become larger with decreasing threshold frequency THn. Also, even when the absolute value of the frequency shift amount $\Delta f$ remains the same, different weighting coefficients A1 and A2 (Z1 and Z2) are selected depending on whether the frequency shift amount $\Delta f$ is positive or negative.

On the other hand, if it is determined in step S232 that the absolute value of the frequency shift amount $\Delta f$ is smaller than threshold frequency TH1 (No in step S232), the controller 15 ends the fifth operation without multiplying the data of the subcarriers by weighting coefficients. Note that, for example, the data of the subcarriers may be multiplied by 1 as weighting coefficients A1 and A2 (Z1 and Z2), in addition to the method which does not multiply the data by weighting coefficients A1 and A2.

That is, in the fifth operation example, the controller 15 changes the weighting coefficients by which data of respective subcarriers are multiplied in accordance with the frequency shift amount $\Delta f$ detected by the AFC unit 13. For example, if $\Delta f>0$, the controller 15 sets to multiply data mapped on the subcarrier of the subcarrier number +1 by the first weighting coefficient A1, and to multiply data mapped on the subcarrier of the subcarrier number −1 by the second weighting coefficient A2 smaller than the first weighting coefficient A1.

[Effect]

According to the first embodiment, since the wireless LAN terminal on the receiving side includes the weight multiplier 17, even when a DC offset cannot be sufficiently canceled, an influence of interference of the DC offset is hardly imposed at the time of error correction.

The controller 15 designates, as subcarriers which are expected to be influenced by the DC offset, subcarriers of the subcarrier numbers ±1 in the vicinity of the DC offset of those assigned numbers from − to +. Then, the controller 15 can set data of the subcarriers at positions where they are readily influenced by the interference of the DC offset to be small values, so that these data can be hardly influenced by the interference of the DC offset.

When the absolute value |$\Delta f$| of the frequency shift amount $\Delta f$ detected by the AFC unit 13 is greater than the predetermined threshold frequency TH, which is set in advance, the controller 15 designates subcarriers of the subcarrier numbers ±1. Thus, an error resilience can be enhanced only when the DC offset generated by the quadrature demodulator 24 interferes. If data are weighted when the DC offset does not interfere, the receiving characteristics deteriorate slightly, thus avoiding such deterioration.

When the absolute value |$\Delta f$| of the frequency shift amount $\Delta f$ detected by the AFC unit 13 is greater than the predetermined threshold frequency TH, which is set in advance, and when the frequency shift amount is positive, the controller 15 instructs to multiply an amplitude value of a demodulated signal mapped on a subcarrier of the subcarrier number −1 by weighting coefficient A. On the other hand, when the frequency shift amount $\Delta f$ is negative, the controller 15 instructs to multiply an amplitude value of a demodulated signal mapped on a subcarrier of the subcarrier number +1 by weighting coefficient A. Thus, an error resilience can be enhanced only when the DC offset generated by the quadrature demodulator 24 interferes. If data are weighted when the DC offset does not interfere, the receiving characteristics deteriorate slightly, thus avoiding such deterioration.

Only when the absolute value |$\Delta f$| of the frequency shift amount $\Delta f$ detected by the AFC unit 13 is greater than the predetermined threshold frequency TH, the controller 15 instructs to multiply amplitude values of demodulated signals mapped on subcarriers of the subcarrier numbers ±1 and ±2 by weighting coefficient A. Thus, an error resilience can be enhanced only when the DC offset generated by the quadrature demodulator 24 interferes. If data are weighted when the DC offset does not interfere, the receiving characteristics deteriorate slightly, thus avoiding such deterioration.

When the absolute value |Δf| of the frequency shift amount Δf detected by the AFC unit 13 is greater than the predetermined threshold frequency TH, the controller 15 checks whether or not the frequency shift amount is greater than zero. When the frequency shift amount Δf is greater than zero, the controller 15 instructs to multiply an amplitude value of a demodulated signal mapped on a subcarrier of the subcarrier number +1 by the first weighting coefficient A1, and to multiply an amplitude value of a demodulated signal mapped on a subcarrier of the subcarrier number −1 by the second weighting coefficient A2. On the other hand, when the frequency shift amount Δf is smaller than zero, the controller 15 instructs to multiply an amplitude value of a demodulated signal mapped on a subcarrier of the subcarrier number +1 by the second weighting coefficient Z2, and to multiply an amplitude value of a demodulated signal mapped on a subcarrier of the subcarrier number −1 by the first weighting coefficient Z1. Thus, an error resilience can be enhanced only when the DC offset generated by the quadrature demodulator 24 interferes. If data are weighted when the DC offset does not interfere, the receiving characteristics deteriorate slightly, thus avoiding such deterioration. Since the subcarriers of the subcarrier numbers ±1 are multiplied by different weights according to the degree of interference of the DC offset, the receiving characteristics can be further improved.

Figure 13:
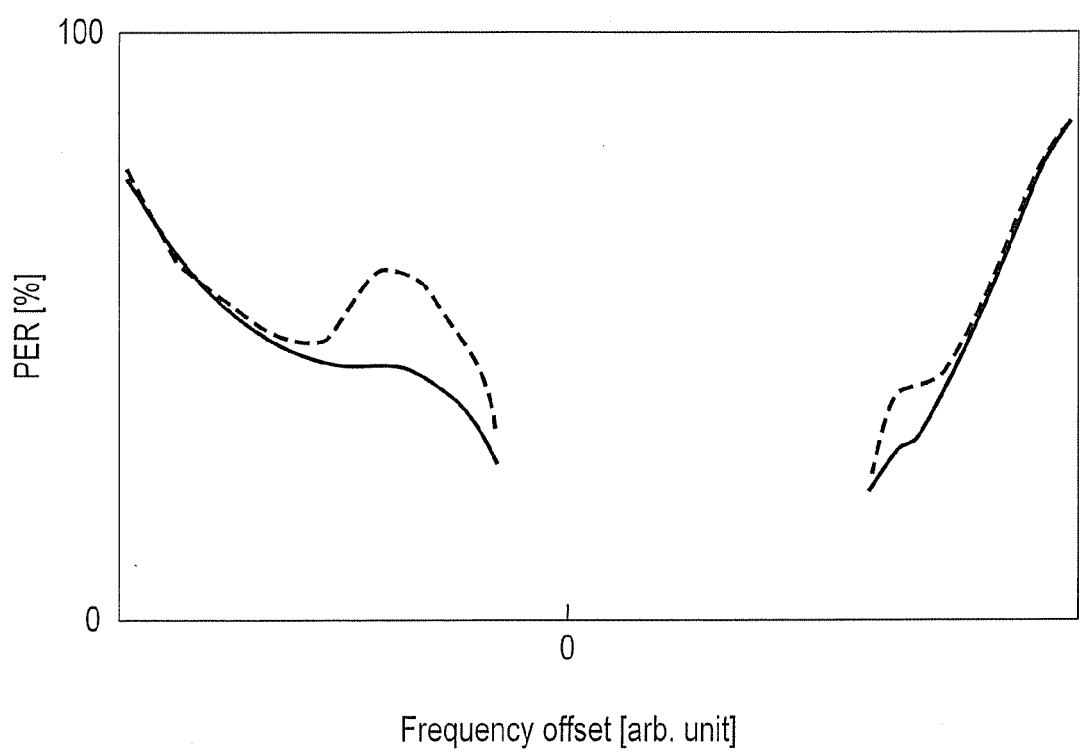
FIG. 13 is a graph showing the relationship between frequency shift amounts and packet error rates (PER)

FIG. 13 shows a graph of the relationship between the frequency shifts Δf and packet error rates (PER).

As indicated by the broken curves in FIG. 13, when subcarriers in the vicinity of the DC component (for example, those of the subcarrier numbers ±1) are multiplied by a constant weighting coefficient irrespective of the magnitude of the absolute value of the frequency shift amount Δf (when they are statically weighted), the PER unwantedly increases when the absolute value of the frequency shift amount Δf is small. That is, by multiplying these subcarriers by the weighting coefficient, the receiving performance deteriorates conversely.

By contrast, the controller 15 according to this embodiment instructs to select weighting coefficient A within the range of 0<A<1 according to the frequency shift amount Δf detected by the AFC unit 13, and to multiply the subcarriers by that weighting coefficient A (to dynamically weight the subcarriers). More specifically, the controller 15 selects the smaller weighting coefficient A with increasing absolute value of the frequency shift amount Δf, and selects the larger weighting coefficient A with decreasing absolute value of the frequency shift amount Δf. This is because as the absolute value of the frequency shift amount Δf is larger, an influence of the DC offset on subcarriers becomes larger, thus deteriorating the reliabilities of the subcarriers.

By dynamically weighting the subcarriers, as indicated by the solid curves in FIG. 13, deterioration of the receiving performance can be suppressed without increasing the PER when the absolute value of the frequency shift amount Δf is small.

Also, even when the absolute value of the frequency shift amount Δf remains the same, the controller 15 of this embodiment selects a different weighting coefficient A depending on whether that amount is positive or negative. In other words, the controller 15 selects weighting coefficient A so that a function between the frequency shift amount Δf and weighting coefficient A is asymmetric on the positive and negative sides. Thus, even when the relationship between the absolute value of the frequency shift amount Δf and receiving performance deterioration (PER) due to the interference is different depending on whether the frequency shift amount Δf is positive or negative, weighting coefficient A can be appropriately set, thus suppressing deterioration of the receiving performance.

Second Embodiment

A wireless LAN terminal in a wireless LAN system according to the second embodiment will be described below with reference to FIGS. 14 and 15.

The second embodiment will examine a case in which a wireless LAN terminal on the receiving side in a multi-carrier wireless transmission system has a plurality of antennas (a plurality of wireless units). At this time, assume that the multi-carrier wireless transmission system is a multiple input, multiple output (MIMO) system in which a wireless LAN terminal on the transmitting side also has a plurality of antennas in the same manner as that on the receiving side, and transmits different signals from the respective antennas.

In the MIMO system, the plurality of antennas of a wireless device on the transmitting side transmit different data for respective antennas, and a wireless device on the receiving side separates and demodulates these combined data using the plurality of antennas, thus largely improving the transmission efficiency.

[Arrangement]

The arrangement of the wireless LAN terminal in the wireless LAN system according to the second embodiment will be described below with reference to FIG. 14.

Figure 14:
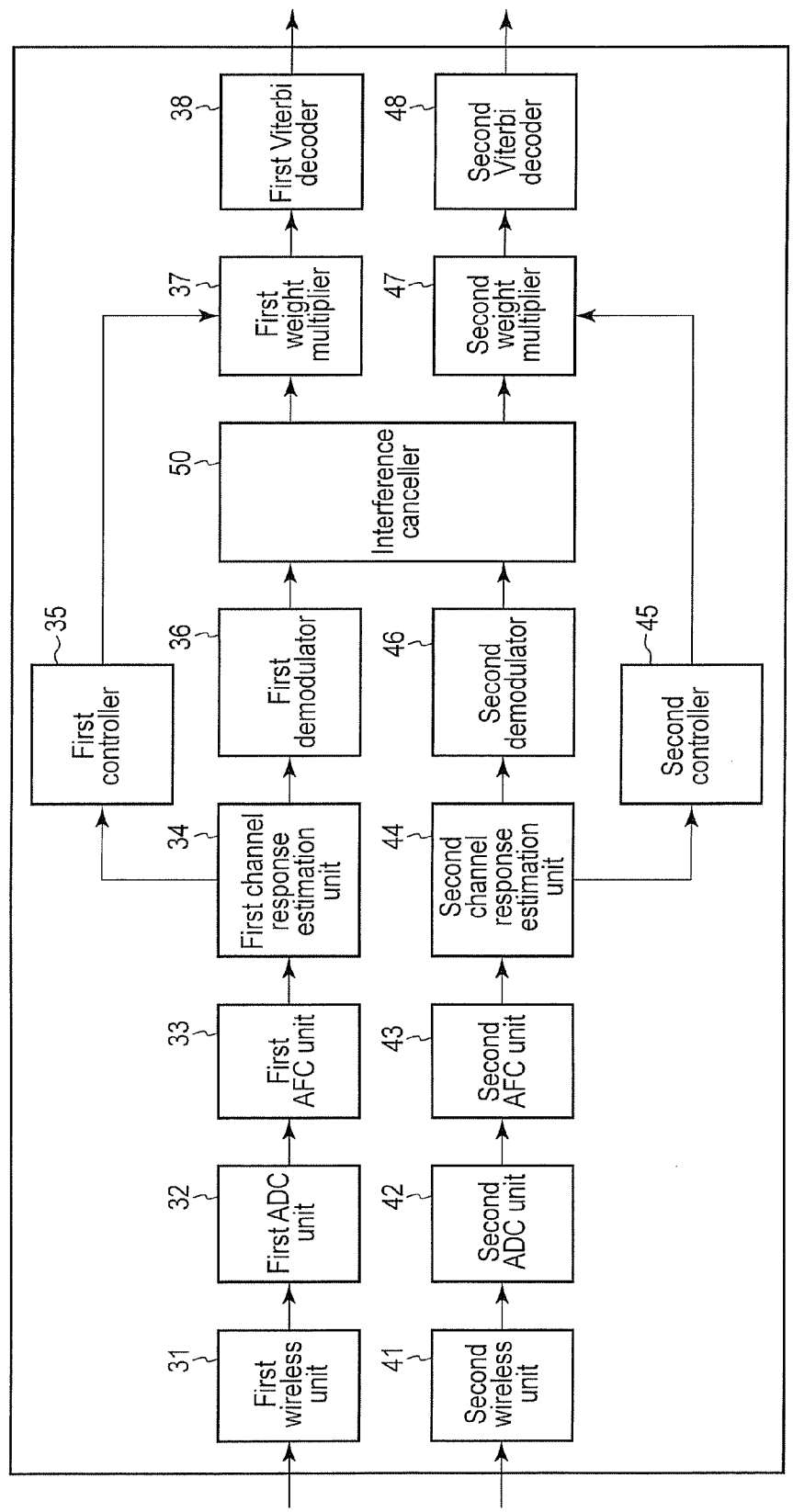
FIG. 14 is a block diagram showing the arrangement of a wireless LAN terminal in a wireless LAN system according to the second embodiment.

FIG. 14 is a block diagram of the wireless LAN terminal in the wireless. LAN system (MIMO system) according to the second embodiment.

As shown in FIG. 14, the wireless LAN terminal in this MIMO system includes a first wireless unit 31, second wireless unit 41, first ADC unit 32, second ADC unit 42, first AFC unit 33, second AFC unit 43, first channel response estimation unit 34, second channel response estimation unit 44, first controller 35, second controller 45, first demodulator 36, second demodulator 46, first weight multiplier 37, second weight multiplier 47, first Viterbi decoder 38, second Viterbi decoder 48, and interference canceller 50.

The first wireless unit 31, second wireless unit 41, first ADC unit 32, second ADC unit 42, first AFC unit 33, second AFC unit 43, first channel response estimation unit 34, second channel response estimation unit 44, first controller 35, second controller 45, first demodulator 36, second demodulator 46, first weight multiplier 37, second weight multiplier 47, first Viterbi decoder 38, and second Viterbi decoder 48 respectively perform the same operations as those of the corresponding units in the first embodiment shown in FIG. 1.

The interference canceller 50 has a function of removing interference components using signals received by antennas of the two wireless units, that is, the first and second wireless units 31 and 41, and then sending data to the respective weight multipliers (first and second weight multipliers 37 and 47).

Sixth Operation Example

A sixth operation example of the wireless LAN terminal in the wireless LAN system according to the second embodiment will be described below with reference to FIG. 15.

FIG. 15 is a flowchart showing the sixth operation example of the wireless LAN terminal.

As shown in FIG. 15, in the wireless LAN terminal on the receiving side in this MIMO system, the first and second wireless units 31 and 41 respectively begin to receive RF signals (step S301).

Upon reception of the RF signal, the first wireless unit 31 converts the received RF signal into a baseband signal by quadrature demodulation. At this time, in the first wireless unit 31, a DC offset value is applied to I and Q axes of the quadrature-demodulated baseband signal. The signals applied with the DC offset are input to the first ADC unit 32 and are converted into digital signals, which are then output to the first AFC unit 33.

Next, the first AFC unit 33 applies coarse AFC using short preambles 61 of the input digital signals. Also, the first AFC unit 33 executes high-precision AFC using long preambles 62 of the digital signals (step S302).

Since the long preamble 62 of the digital signal is a given signal, the first channel response estimation unit 34 performs channel response estimation using the input long preamble 62 (step S303).

Next, the first demodulator 36 demodulates data fields of the digital signal (step S304). More specifically, the first demodulator 36 extracts data to be input to FFT from the input digital signal, converts them from time-axis signals into frequency-axis signals, and multiplies these signals by conjugate complex numbers of channel response estimated values. After that, the demodulated digital signals are output to the interference canceller 50.

On the other hand, since the second wireless unit 41 also begins to receive an RF signal simultaneously with the first wireless unit 31 (step S305), it converts the received RF signal into a baseband signal. At this time, a DC offset value is applied to I and Q axes of the quadrature-converted baseband signal.

The signals applied with the DC offset are input to the second ADC unit 42 and are converted into digital signals, which are then output to the second AFC unit 43.

Next, the second AFC unit 43 applies coarse AFC using short preambles 61 of the input digital signals. Also, the second AFC unit 43 executes high-precision AFC using long preambles 62 of the digital signals (step S306).

Since the long preamble 62 of the digital signal is a given signal, the second channel response estimation unit 44 performs channel response estimation using the input long preamble 62 (step S307).

The second demodulator 46 then demodulates data fields of the digital signal (step S308). More specifically, the second demodulator 46 extracts data to be input to FFT from the input digital signal, converts them from time-axis signals into frequency-axis signals, and multiplies these signals by conjugate complex numbers of channel response estimated values. After that, the demodulated digital signals are output to the interference canceller 50.

Next, the interference canceller 50 removes interference components using the digital signals quadrature-demodulated by the first and second wireless units 31 and 41 (step S309), and the digital signals from which the interference components are removed are respectively output to the first and second weight multipliers 37 and 47.

The first weight multiplier 37 then multiplies data mapped on subcarriers, which are output from the interference canceller 50 according to a subcarrier designation instruction from the first controller 35, by a weighting coefficient (step S310). In this example, data mapped on subcarriers of subcarrier numbers ±1 are multiplied by a weighting coefficient A1 (<1). At this time, weighting coefficient A1 selected by the first controller 35 based on a frequency shift amount f is multiplied.

After that, the digital signals multiplied by weighting coefficient A1 are input to the first Viterbi decoder 38, which performs error correction (step S311). Then, the error-corrected data are output.

On the other hand, the second weight multiplier 47 multiplies data mapped on subcarriers, which are output from the interference canceller 50 according to a subcarrier designation instruction from the second controller 45, by a weighting coefficient (step S312). In this example, data mapped on subcarriers of subcarrier numbers ±1 are multiplied by a weighting coefficient A2 (<1). At this time, weighting coefficient A2 selected by the second controller 45 based on the frequency shift amount $\Delta f$ is multiplied. Also, weighting coefficients A1 and A2 are set in advance according to performances of the respective wireless units (first and second wireless units 31 and 41), and may assume the same or different values.

After that, the digital signals multiplied by weighting coefficient A2 are input to the second Viterbi decoder 48, which performs error correction (step S313). Then, the error-corrected data are output.

In this wireless LAN system, when the Viterbi decoder is used as an error correction unit, a convolution encoder is used as an error correction encoder on the transmitting side. When a turbo encoder is used as an error correction encoder on the transmitting side, a turbo decoder is used as an error correction decoder on the receiving side.

[Effect]

According to the second embodiment, in the MIMO system, the same effects as in the first embodiment can be obtained.

Note that in the respective embodiments, error correction encoding on the transmitting side is attained by the convolution encoder, and error correction decoding on the receiving side is attained by the Viterbi decoder. Alternatively, as other coding systems, for example, a combination of a turbo encoder and turbo decoder may be used.

Third Embodiment

A wireless LAN terminal in a wireless LAN system according to the third embodiment will be described below with reference to FIGS. 16, 17, 18, 19, 20, and 21.

In the above embodiments, after data of subcarriers are multiplied by a weighting coefficient, error correction is performed. By contrast, in an example of the third embodiment, after data of subcarriers are multiplied by a weighting coefficient, channel response estimation (smoothing) is performed. Note that in the third embodiment, a description of the same points as those in the above embodiments will not be repeated, and differences will be mainly described.

[Arrangement]

The arrangement of the wireless LAN terminal in the wireless LAN system according to the third embodiment will be described below with reference to FIGS. 16 and 17.

Figure 16:
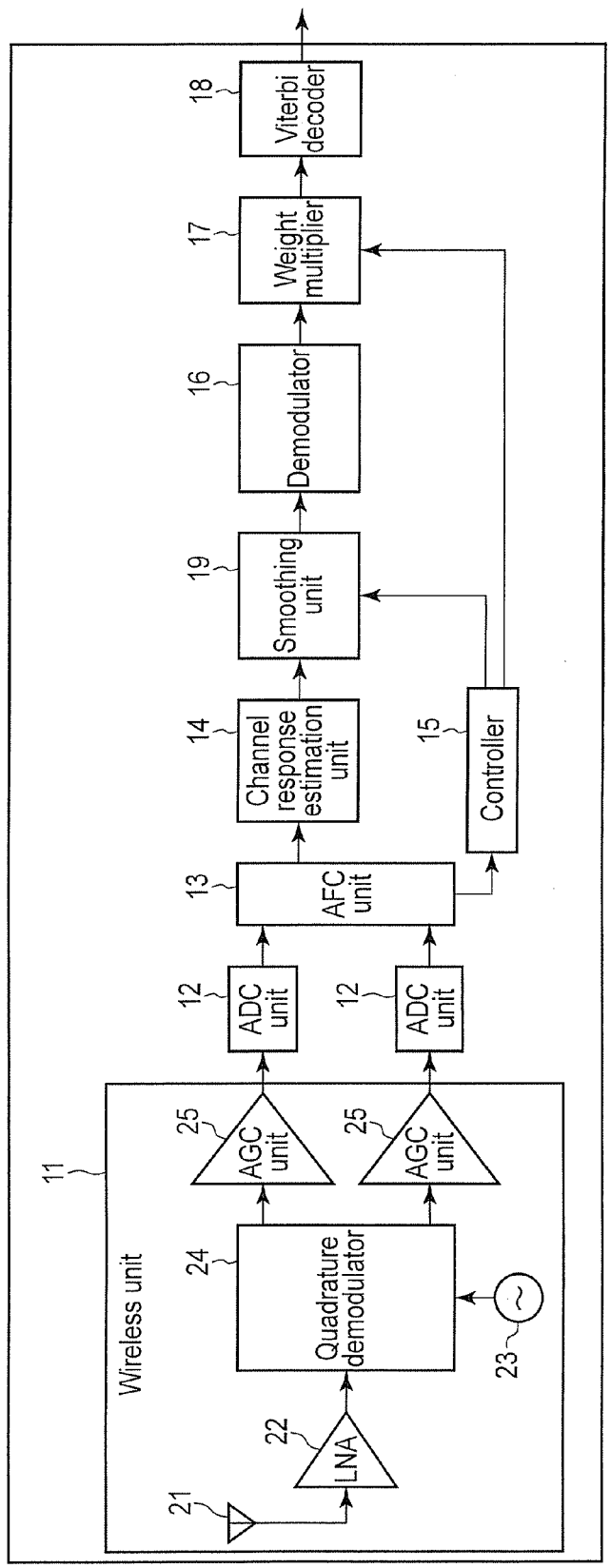
FIG. 16 is a block diagram showing the arrangement of a wireless LAN terminal in a wireless LAN system according to the third embodiment.

FIG. 16 is a block diagram of the wireless LAN terminal in the wireless LAN system according to the third embodiment, and FIG. 17 is a block diagram of a smoothing unit 19 of the wireless LAN terminal shown in FIG. 16.

As shown in FIG. 16, in the third embodiment, a difference from the above embodiments is that the wireless LAN terminal has a smoothing unit 19 including a weight multiplier.

A smoothing unit 19 smoothes channel response estimated values, which are obtained from a channel response estimation unit 14, for m successive subcarriers on a frequency axis, so as to correct them to new channel response estimated values.

More specifically, as shown in FIG. 17, the smoothing unit 19 includes registers 191-1, 191-2, and 191-3, amplitude measuring units 192-1, 192-2, and 192-3, dividers 193-1, 193-2, and 193-3, weight multipliers 194-1, 194-2, 194-3, 195-1, 195-2, and 195-3, vector synthesizer 196, averaging unit 197, amplitude measuring unit 198, divider 199, and multiplier 200. Note that in FIG. 17, a channel response estimated value of a subcarrier stored in register 191-2 is corrected.

Registers 191-1, 191-2, and 191-3 store channel response estimated values for subcarriers output from the channel response estimation unit 14.

The amplitude measuring units 192-1, 192-2, and 192-3 calculate amplitude values of vector values of the channel response estimated values for respective subcarriers.

The dividers 193-1, 193-2, and 193-3 convert the vectors of the channel response estimated values for respective subcarriers into unit vectors.

The vector synthesizer 196 adds the unit vectors of the vectors of the channel response estimated values for respective subcarriers.

The averaging unit 197 calculates an average amplitude of the vectors of the channel response estimated values for respective subcarriers.

The multiplier 200 multiplies a vector, which is output from the vector synthesizer 196 and is converted into a unit vector by the amplitude measuring unit 198 and divider 199, by an output from the averaging unit 197.

The weight multipliers 194-1, 194-2, 194-3, 195-1, 195-2, and 195-3 multiply the vectors of the channel response estimated values by weighting coefficients according to an instruction from the controller 15.

Each of the weight multipliers 194-1, 194-2, 194-3, 195-1, 195-2, and 195-3 has the same structure as that of a weight multiplier 17 shown in FIG. 3. That is, each of the weight multipliers 194-1, 194-2, 194-3, 195-1, 195-2, and 195-3 includes a subcarrier number detection processor 171, storage unit 172, and amplitude/weighting coefficient multiplication processor 173.

The subcarrier number detection processor 171 detects on which of subcarriers input data are mapped.

The storage unit 172 pre-stores a plurality of weighting coefficients to be multiplied with amplitude values of data.

The amplitude/weighting coefficient multiplication processor 173 multiplies amplitude values of data signals, which are mapped on subcarriers of subcarrier numbers designated by the controller 15, of those input from the channel response estimation unit 14 by the weighting coefficient pre-stored in the storage unit 172. At this time, when channel response estimated values for subcarriers which suffer interference caused by a DC offset are used in smoothing, the amplitude/weighting coefficient multiplication processor 173 multiplies the amplitude values by the weighting coefficient selected by the controller 15 based on a frequency shift amount $\Delta f$ of a plurality of weighting coefficients A pre-stored in the storage unit 172.

For example, as the weighting coefficient, B1 is used for a vector value from register 191-1, B2 is used for a vector value from register 191-2, B3 is used for a vector value from register 191-3, and a relationship B1+B2+B3=1 (to normalize a synthesized amplitude value, where B1, B3≤B2) is satisfied.

In this case, when data of a subcarrier stored in register 191-1 or 191-3 suffers interference caused by a DC offset, weighting coefficient B1 or B3 is set to be small based on a frequency shift amount $\Delta f$. Alternatively, weighting coefficient B1 or B3 may be set to be zero (not used in smoothing).

Seventh Operation Example

A seventh operation of the wireless LAN terminal in the wireless LAN system according to the third embodiment will be described below with reference to FIGS. 18, 19, 20, and 21.

FIG. 18 shows an example of channel response estimated value vectors for subcarriers according to the third embodiment. FIG. 19 shows a comparison example of a correction value of the channel response estimated value vectors shown in FIG. 18 in association with the third embodiment. FIG. 20 is a flowchart of the seventh operation example of the wireless LAN terminal. FIG. 21 shows an example of a correction value of the channel response estimated value vectors shown in FIG. 18 according to the third embodiment.

A case will be examined below wherein amplitude variations have occurred like subcarriers 1, 2, and 3 in channel response estimated values detected from long preambles 62, as shown in FIG. 18. When subcarrier 2 is to be smoothed, if a vector-averaging result of subcarriers 1, 2, and 3 is used intact as a phase of subcarrier 2, a phase difference between subcarriers 1 and 2 becomes narrow under the influence of subcarrier 1 having a large amplitude in a synthesized vector, as shown in FIG. 19.

By contrast, in this embodiment, the smoothing unit 19 executes the processing sequence shown in FIG. 20. In this case, an output from the channel response estimation unit 14 is set as H(J): J=1 . . . m.

When the smoothing unit 19 starts control processing, it is initially activated to have J=0 (step S401).

Next, it is judged if J<m−2 (step S402). If J<m−2 (Yes in step S402), values are set in registers 191-1, 191-2, and 191-3 (step S403). Initial values H(1), H(2), and H(3) are respectively set in registers 191-1, 191-2, and 191-3.

After that, the amplitude measuring units 192-1 to 192-3 respectively calculate amplitude values a1, a2, and a3 of vectors stored in registers 191-1 to 191-3 as follows (step S404).

$$a1=|H(1)|$$

$$a2=|H(2)|$$

$$a3=|H(3)|$$

Next, the dividers 193-1 to 193-3 divide the vectors by the respective amplitude values to generate unit vectors (step S405), which are input to the weight multipliers 194-1 to 194-3.

The weight multipliers 194-1 to 194-3 multiply the unit vectors output from the dividers 193-1 to 193-3 by weighting coefficients (step S406). At this time, especially when channel response estimated values for subcarriers (for example, those of subcarrier numbers ±1) which suffer interference of a DC offset are used in smoothing, the amplitude value of the vector is multiplied by the weighting coefficient selected by the controller 15 based on the frequency shift amount $\Delta f$ of those which are pre-stored in the storage unit 172.

The vector synthesizer 195 vector-synthesizes (adds) the three weighted unit vectors (step S407). Then, the added three unit vectors are expressed by:

$$B1H(1)/a1+B2H(2)/a2+B3H(3)/a3$$

Next, the amplitude measuring unit 198 calculates an amplitude value a4 of the synthesized vector, and the divider 199 generates a unit vector V1 (step S408). Then, the amplitude a4 of the synthesized vector and the unit vector V1 are respectively expressed by:

$$a4=|B1H(1)/a1+B2H(2)/a2+B3H(3)/a3|$$

$$V1=(B1H(1)/a1+B2H(2)/a2+B3H(3)/a3)/a4$$

On the other hand, the weight multipliers 195-1 to 195-3 multiply the amplitude values of the respective vectors output from the amplitude measuring units 192-1 to 192-3 by weighting coefficients (step S409). At this time, especially when channel response estimated values for subcarriers (for example, those of subcarrier numbers ±1) which suffer interference of a DC offset are used in smoothing, the amplitude value of the vector is multiplied by the weighting coefficient selected by the controller 15 based on the frequency shift Δf of those which are pre-stored in the storage unit 172.

Next, the averaging unit 197 averages the amplitude values of the three weighted vectors (step S410). Thus, an average amplitude value a5 of vectors B1H(1), B2H(2), and B3H(3) is calculated by:

$$a5=(B1a1+B2a2+B3a3)/3$$

The multiplier 200 multiplies the unit vector V1 by the average amplitude value a5 (step S411).

$$a5V1$$

This value is used as a corrected value of the vector H(2), that is, a dotted line vector shown in FIG. 21. This output value (corrected vector) is written in register 191-1. The contents of register 191-3 are moved to register 191-2. H(4) is written to register 191-3 (step S412).

Then, similar calculations are made to obtain a corrected value of H(3). With this sequence, correction is complete when H(m) is input to register 191-3. Of channel response estimated values H(1) to H(m), H(2) to H(m−1) are corrected. H(1) and H(m) as two ends of subcarriers are not corrected.

Note that the number of vectors to be averaged is three. However, the present embodiment is not limited to three.

[Effect]

According to the third embodiment, by smoothing the channel response estimated values by the aforementioned simple calculations, phase differences between subcarriers can be set to be nearly equal to each other, thus improving the channel response estimation precision. Also, in this embodiment, the channel response estimated values of subcarriers which suffer interference caused by a DC offset are multiplied by small weighting coefficients based on a frequency shift amount or are not used in smoothing (multiplied by a weighting coefficient=0), thus further improving channel response estimation precision.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device which comprises an automatic frequency controller configured to receive a signal OFDM-modulated using subcarriers, and detect a radio frequency shift amount between a transmitting side and a receiving side, comprising:
   a controller configured to designate subcarrier that suffers interference caused by a DC component based on the radio frequency shift amount between the transmitting side and the receiving side which is detected by the automatic frequency controller;
   a first weight multiplier configured to multiply amplitude values of demodulated signals of signals carried by the subcarriers designated by the controller by a weighting coefficient in a range from 0 to 1; and
   an error correction decoder configured to perform error correction of the demodulated signals multiplied by the weighting coefficient by the first weight multiplier,
   wherein the controller sets the weighting coefficient to be multiplied by the first weight multiplier based on the radio frequency shift amount between the transmitting side and the receiving side.

2. The device of claim 1, wherein the controller sets a smaller weighting coefficient as an absolute value of the radio frequency shift amount between the transmitting side and the receiving side is larger, and sets a larger weighting coefficient as the absolute value of the radio frequency shift amount between the transmitting side and the receiving side is smaller.

3. The device of claim 1, wherein even when the absolute value of the radio frequency shift amount between the transmitting side and the receiving side remains the same, the controller sets a different weighting coefficient depending on whether the radio frequency shift amount between the transmitting side and the receiving side is positive or negative.

4. The device of claim 1, wherein the controller sets a weighting coefficient to be multiplied by the first weight multiplier by comparing the radio frequency shift amount between the transmitting side and the receiving side with threshold frequencies which are set in advance.

5. The device of claim 4, wherein the controller sets a weighting coefficient by which the second subcarrier or the third subcarrier is multiplied by the second weight multiplier to be zero.

6. The device of claim 1, wherein the controller sets a weighting coefficient to be multiplied by the first weight multiplier by looking up a table which stores the radio frequency shift amounts between the transmitting side and the receiving side and weighting coefficients in association with each other.

7. The device of claim 1, further comprising:
   a channel response estimation unit configured to estimate channel responses of the subcarriers; and
   a smoothing unit configured to smooth and correct each of the channel responses of the subcarriers estimated by the channel response estimation unit,
   wherein the smoothing unit comprises:
   a second weight multiplier configured to multiply each of the channel responses of the subcarriers estimated by the channel response estimation unit by a weighting coefficient within a range from 0 to 1 (inclusive);
   an adder configured to calculate a sum value by adding a channel response of a first subcarrier multiplied by the weighting coefficient by the second weight multiplier, a channel response of a second subcarrier which neighbors a high-frequency side of the first subcarrier multiplied by the weighting coefficient by the second weight multiplier, and a channel response of a third subcarrier which neighbors a low-frequency side of the first subcarrier multiplied by the weighting coefficient by the second weight multiplier; and an arithmetic unit configured to calculate an average value of the sum value as a corrected value of the first subcarrier, and when the second subcarrier or the third subcarrier is designated as a subcarrier which suffers interference caused by a DC component, the controller sets a weighting coefficient by which the second subcarrier or the third subcarrier is multiplied by the second weight multiplier to be a small value.

* * * * *